United States Patent
Mitarai

(10) Patent No.: US 11,023,822 B2
(45) Date of Patent: Jun. 1, 2021

(54) CLASSIFIER GENERATION APPARATUS FOR GENERATING A CLASSIFIER IDENTIFYING WHETHER INPUT DATA IS INCLUDED IN A SPECIFIC CATEGORY BASED ON MACHINE LEARNING, CLASSIFIER GENERATION METHOD, AND STORAGE MEDIUM

(71) Applicant: CANON KABUSHIKI KAISHA, Tokyo (JP)

(72) Inventor: Yusuke Mitarai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1227 days.

(21) Appl. No.: 15/273,221

(22) Filed: Sep. 22, 2016

(65) Prior Publication Data
US 2017/0091671 A1  Mar. 30, 2017

(30) Foreign Application Priority Data

Sep. 25, 2015 (JP) .............................. JP2015-188365

(51) Int. Cl.
G06N 20/00 (2019.01)
G06F 16/28 (2019.01)
G06N 7/00 (2006.01)

(52) U.S. Cl.
CPC ........... *G06N 20/00* (2019.01); *G06F 16/285* (2019.01); *G06N 7/005* (2013.01)

(58) Field of Classification Search
None
See application file for complete search history.

(56) References Cited

U.S. PATENT DOCUMENTS 5,666,157 A * 9/1997 Aviv ................ G08B 13/19602
348/150
7,274,819 B2 * 9/2007 Matsugu ............ G06K 9/00281
382/181

(Continued)

FOREIGN PATENT DOCUMENTS

JP     2006-079272 A    3/2006
JP       4369961 B2    11/2009

OTHER PUBLICATIONS

Kindermann, Jörg, Gerhard Paali, and Edda Leopold. "Error correcting codes with optimized Kullback-Leibler distances for text categorization." European Conference on Principles of Data Mining and Knowledge Discovery. Springer, Berlin, Heidelberg, 2001. (Year: 2001).*

(Continued)

*Primary Examiner* — Daniel T Pellett
(74) *Attorney, Agent, or Firm* — Canon U.S.A, , Inc, IP Division

(57) ABSTRACT

There is provided a classifier capable of classifying unknown abnormal data input to the classifier even if there is a small number of abnormal data used for the learning of the classifier. When learning parameters of the classifier, the specific category likelihood of normal patterns for learning relatively deviating from a group of normal patterns for learning is decreased relatively to the specific category likelihood of normal patterns for learning not relatively deviating from the group of normal patterns for learning, and the specific category likelihood of abnormal patterns for learning is decreased relatively to the specific category likelihood of the group of normal patterns for learning.

15 Claims, 18 Drawing Sheets

(56) References Cited

U.S. PATENT DOCUMENTS

| | | | | |
|---|---|---|---|---|
| 2008/0016016 A1* | 1/2008 | Mitarai | ............... | G06K 9/6232 |
| | | | | 706/25 |
| 2010/0272351 A1* | 10/2010 | Kato | ................... | G06K 9/4604 |
| | | | | 382/159 |
| 2012/0045120 A1* | 2/2012 | Tate | .................... | G06K 9/6282 |
| | | | | 382/159 |
| 2012/0057791 A1* | 3/2012 | Mitarai | ............... | G06K 9/6267 |
| | | | | 382/190 |

OTHER PUBLICATIONS

Lee, Changki, and Myung-Gil Jang. "Fast Training of Structured SVM Using Fixed-Threshold Sequential Minimal Optimization." ETRI journal 31.2 (2009): 121-128. (Year: 2009).*

Wu, et al., "On Generalizable Low False-Positive Learning Using Asymmetric Support Vector Machines", IEEE Transactions on Knowledge and Data Engineering, vol. 25, No. 5, pp. 1083-1096, May 2013.

Dalal, et al., "Human Detection using Oriented Histograms of Flow and Appearance", IEEE European Conference on Computer Vision, Computer Vision—ECCV 2006, 9th European Conference on Computer Vision, Graz, Austria, May 7-13, 2006, Proceedings, Part II, vol. 2, pp. 428-441.

Sugiyama, "New Approach to Machine Learning Based on Density Ratio", Statistical Mathematics, vol. 58, No. 2, pp. 141-155, 2010 (Partial English translation included).

\* cited by examiner

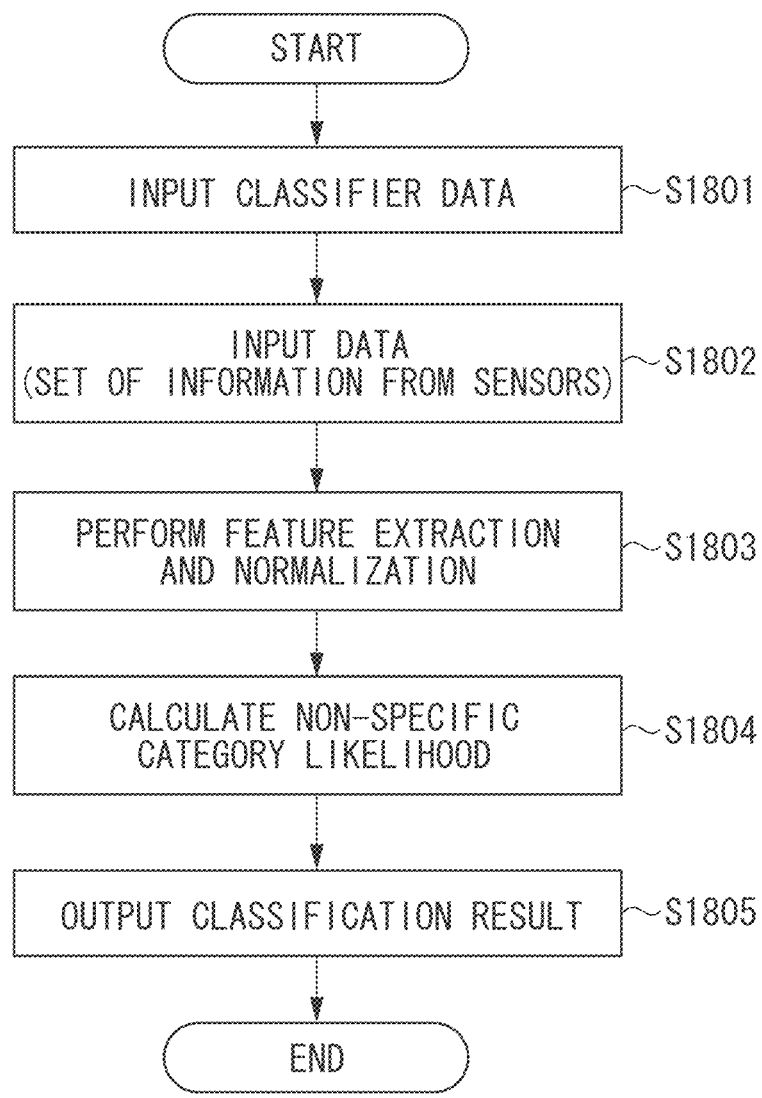

CLASSIFIER GENERATION APPARATUS FOR GENERATING A CLASSIFIER IDENTIFYING WHETHER INPUT DATA IS INCLUDED IN A SPECIFIC CATEGORY BASED ON MACHINE LEARNING, CLASSIFIER GENERATION METHOD, AND STORAGE MEDIUM

BACKGROUND OF THE INVENTION

Field of the Invention

The present invention relates to a classifier generation apparatus, a classifier generation method, and a storage medium. More specifically, the present invention relates to a classifier generation apparatus, a classifier generation method, and a storage medium suitable for identifying whether input data belongs to a specific category.

Description of the Related Art

Various methods are proposed for identifying whether a pattern (data) input to a classifier is a pattern in a specific category. These methods can be used for an application, for example, for detecting a pattern in a specific category (hereinbelow, referred to as a specific category pattern) from among a large number of data, and, conversely detecting a pattern in a category different from the specific category (hereinbelow, referred to as a non-specific category pattern).

As a general method for identifying whether a pattern is a specific category pattern, there is a method of using what is called a 2-class classifier represented by the Support Vector Machine (SVM). This method is a method of training a classifier to separate specific category patterns and non-specific category patterns by using a large number of specific category patterns and a large number of non-specific category patterns, and, by using the classifier, classifying a pattern input to the classifier. However, with this method, if there is a small number of non-specific category patterns used for the learning of the classifier, the classifier may be trained to erroneously determine a non-specific category pattern not used for the learning of the classifier as a specific category pattern. For example, in an application for detecting an abnormal situation based on images captured by a monitoring camera, a normal range is recognized as a specific category and a certain abnormal situation is recognized as a non-specific category. In this case, if there is a small number of patterns of abnormal situations used for the learning of the classifier, the possibility that such a situation occurs is high. More specifically, the classifier may learn to determine as normal an abnormal situation not used for learning.

On the other hand, there is a method of using a 1-class classifier represented by the 1-class SVM. This method, by using a large number of specific category patterns, trains the classifier so as to model a range of specific category patterns and, by using the classifier, classifies a pattern input to the classifier. However, with this method, non-specific category patterns cannot be used for learning. Therefore, it is not possible to perform the learning so as to be able to heighten the detection sensitivity to patterns known to be determined as not a specific category pattern (so as to be able to determine the pattern as a non-specific category pattern with a high probability) although the pattern is similar to a specific category pattern. For example, in an application of detecting abnormal situations based on images captured by a monitoring camera, it is impossible to train the classifier so as to be able to heighten the detection sensitivity to patterns which should be determined as an abnormal situation although the pattern is close to a known normal range. Therefore, the possibility of overlooking such an abnormal situation is high.

U.S. Pat. No. 4,369,961 discusses a technique of learning normal behavior models and abnormal behavior models and integrating the similarity for respective models to detect an abnormal behavior.

Wu, S.-H., K.-P. Lin, H.-H. Chien, C.-M. Chen and M.-S. Chen, "On Generalizable Low False-Positive Learning Using Asymmetric Support Vector Machines", IEEE Trans. on Knowledge and Data Engineering, Vol. 25, No. 5, pp. 1083-1096, 2013 discusses Asymmetric SVM. Asymmetric SVM is a method in which the SVM and the 1-class SVM are combined. This method simultaneously maximizes the margin between specific category patterns and non-specific category patterns, and the margin between the origin in the feature space and specific category patterns, representing patterns not similar to patterns used for learning.

With the technique discussed in U.S. Pat. No. 4,369,961, it is necessary that a sufficient amount of data for abnormal behaviors exists when learning abnormal behavior models. Therefore, if there is a small number of abnormal behavior data, it is not easy to generate suitable abnormal behavior models.

In the technique discussed in Wu, S.-H., K.-P. Lin, H.-H. Chien, C.-M. Chen and M.-S. Chen, "On Generalizable Low False-Positive Learning Using Asymmetric Support Vector Machines", IEEE Trans. on Knowledge and Data Engineering, Vol. 25, No. 5, pp. 1083-1096, 2013, the detection sensitivity to known specific patterns is guaranteed. However, increasing the detection sensitivity to known non-specific category patterns lowers the detection sensitivity to unknown non-specific category patterns. More specifically, when detecting known non-specific category patterns as non-specific category patterns without overlooking, unknown non-specific category patterns are likely to be determined as specific category patterns. Therefore, abnormal data is likely to be determined as normal data. Therefore, it is not suitable for applications required to avoid overlooking of abnormal data.

SUMMARY OF THE INVENTION

According to an aspect of the present invention, a classifier generation apparatus configured to generate a classifier for calculating a value representing a specific category likelihood for input data based on a predetermined parameter and identifying whether the input data is data belonging to the specific category based on a result of the calculation, includes an input unit configured to input a plurality of specific category data for learning known to belong to a specific category and at least one piece of non-specific category data for learning known not to belong to the specific category, an acquisition unit configured to acquire a feature amount based on the plurality of specific category data for learning and the at least one piece of non-specific category data for learning, and a determination unit configured to determine the parameter based on the acquired feature amount, wherein the determination unit determines the parameter so that, with a decrease in the specific category likelihood of data relatively deviating from a distribution of the plurality of specific category data for learning known to belong to the specific category, the likelihood of the at least one piece of non-specific category data for learning known not to belong to the specific category becomes relatively smaller than the likelihood of the specific category data for learning.

According to the exemplary embodiments of the present invention, it becomes possible to classify data belonging to an unknown non-specific category input to a classifier even if there is a small number of data belonging to a non-specific category used for learning.

Further features of the present invention will become apparent from the following description of exemplary embodiments with reference to the attached drawings.

BRIEF DESCRIPTION OF THE DRAWINGS

FIG. 18 is a flowchart illustrating a third example of processing performed by the classifier.

DESCRIPTION OF THE EMBODIMENTS

Exemplary embodiments of the present invention will be described below with reference to the accompanying drawings.

First, a first exemplary embodiment will be described below. In the present exemplary embodiment, an example method will be described where the learning of a pattern classifier for detecting abnormalities in a monitoring area is performed based on a moving image captured by a monitoring camera. In the present exemplary embodiment, a situation where no abnormality has occurred, i.e., a normal situation, is defined as a specific category, and a situation where a certain abnormality has occurred is defined as a non-specific category. In the present exemplary embodiment, specific category data, i.e., a moving image of a normal situation captured by the monitoring camera is referred to as normal data as needed. Further, data of a non-specific category, i.e., a moving image of a certain abnormal situation captured by the monitoring camera is referred to as abnormal data as needed. In the present exemplary embodiment, a learning method for training a classifier that can determine whether input data is normal or abnormal by using preacquired data including a large number of normal data and at least one piece of abnormal data.

Figure 1:
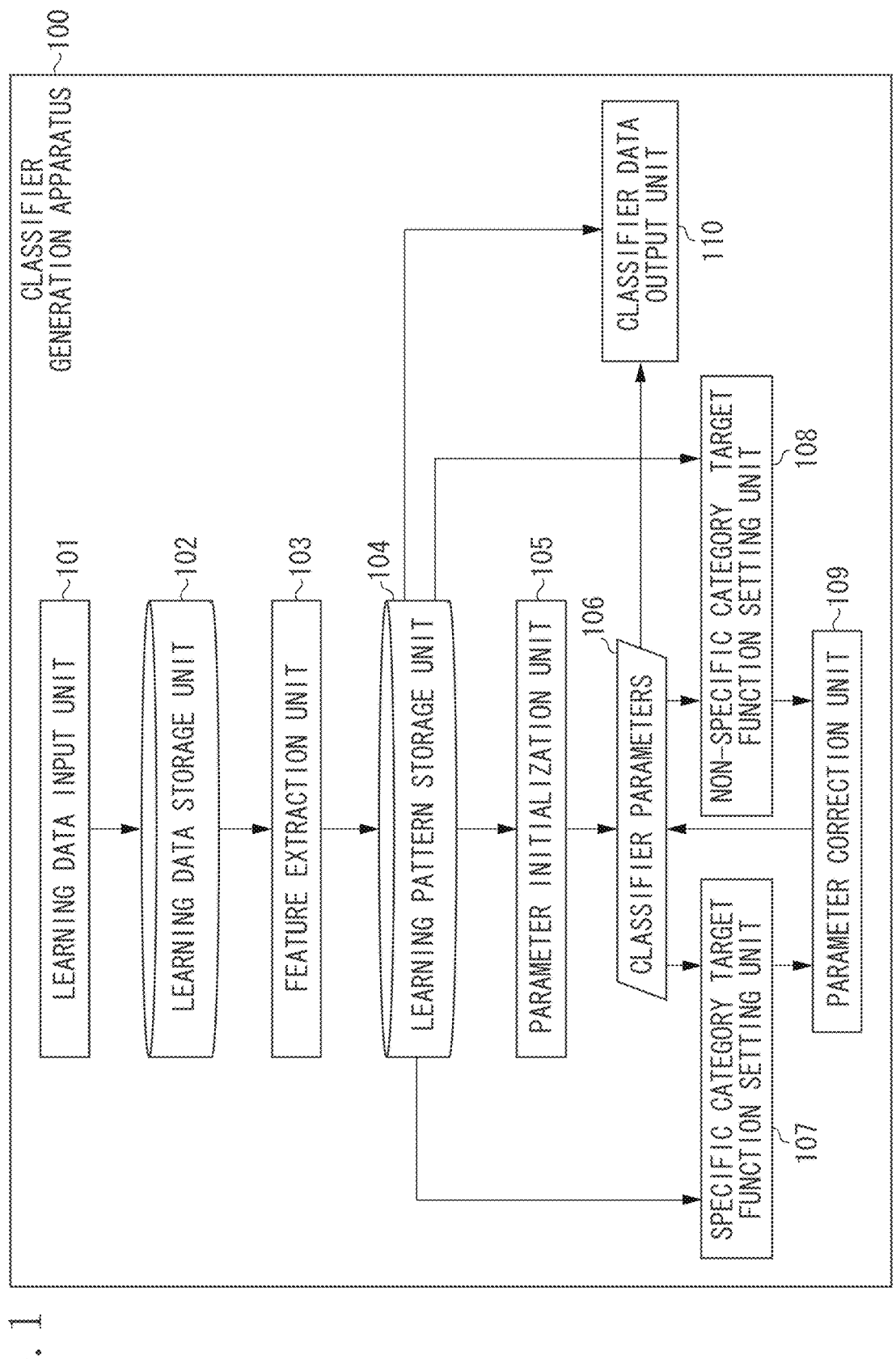
FIG. 1 is a block diagram illustrating a first example of a configuration of a classifier generation apparatus.
Figure 2:
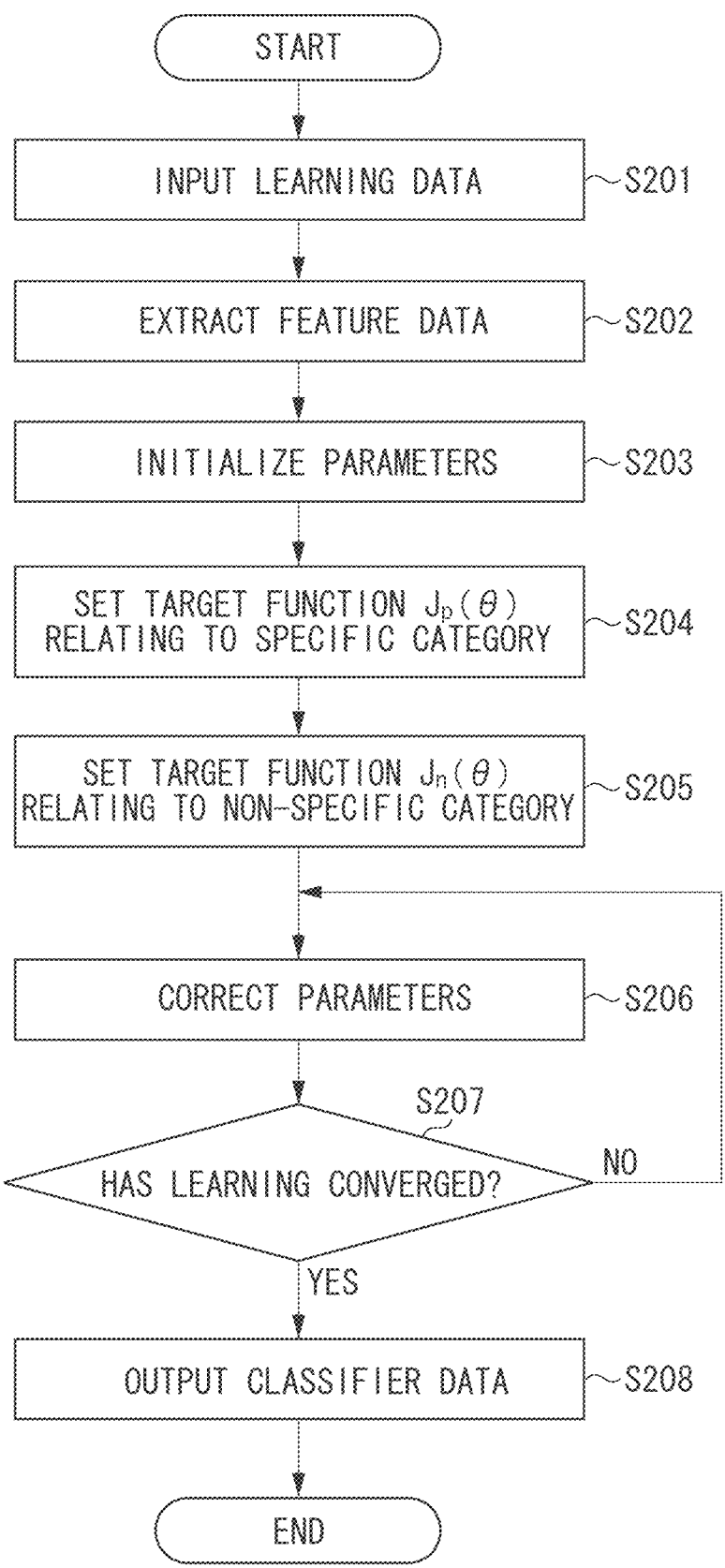
FIG. 2 is a flowchart illustrating a first example of processing performed by the classifier generation apparatus.

FIG. 1 illustrates an example of a function configuration of a classifier generation apparatus 100. FIG. 2 is a flowchart illustrating an example of processing performed by the classifier generation apparatus 100. An example of a classifier learning method according to the present exemplary embodiment will be described below with reference to FIGS. 1 and 2.

In step S201, a learning data input unit 101 inputs a large number of learning data. The learning data is used for the learning of the classifier. In the present exemplary embodiment, a large number of normal data and at least one abnormal data piece are used as a large number of learning data. The learning data input unit 101 inputs N (N is an integer equal to or greater than 2) normal data and M (M is an integer equal to or greater than 1) abnormal data as the learning data, and records these data in a learning data storage unit 102. The learning data is data known to be specific or non-specific category data (more specifically, data known to be normal or abnormal). In the present exemplary embodiment, normal data is an example of specific category data for learning, and abnormal data is an example of non-specific category data for learning.

In step S202, a feature extraction unit 103 extracts feature data (feature amount) from the learning data recorded in the learning data storage unit 102 in step S201. In the present exemplary embodiment, since a moving image is used as data, the feature extraction unit 103 extracts, for example, a Cubic Higher-order Local Auto-Correlation (CHLAC) discussed in Japanese Patent Application Laid-Open No. 2006-079272 as feature data targeting a moving image. Thus, a 251-dimensional feature vector is extracted from one piece of learning data. The feature extraction unit 103 associates with the extraction source learning data the 251-dimensional feature vectors extracted from respective pieces of learning data and records the feature vectors in a learning pattern storage unit 104. In the following descriptions of the present exemplary embodiment, feature vectors extracted from normal data and recorded in the learning pattern storage unit 104 are referred to as normal patterns as needed, and feature vectors extracted from abnormal data and recorded in the learning pattern storage unit 104 are referred to as abnormal patterns as needed. In the present exemplary embodiment, N 251-dimensional feature vectors are recorded in the learning pattern storage unit 104 as normal patterns, and M 251-dimensional feature vectors are recorded therein as abnormal patterns. A case where the CHLAC is extracted as feature data has been described above as an example. However, for example, the Motion Boundary Histogram (MBH) feature discussed in Dalal, N., and B. Triggs and C. Schmid, "Human Detection using Oriented Histograms of Flow and Appearance", IEEE European Conference on Computer Vision, Vol. 2, pp. 428-441, 2006 may be extracted as feature data.

In step S203, a parameter initialization unit 105 initializes N coefficients $\{\alpha_i\}$ (i=1, 2, ..., N). This coefficient $\{\alpha_i\}$ is a parameter included in a formula used by the learning target classifier to derive the normality which numerically represents the specific category likelihood for input data for the classifier. The coefficient $\{\alpha_i\}$ will be described in detail below. The parameter initialization unit 105 initializes N parameters at random so as to satisfy the following two conditions.

$$0 \leq \alpha_i \leq 1/(\nu N) \quad \text{Condition 1:}$$

$$\Sigma[i=1 \text{ to } N]\alpha_i=1 \quad \text{Condition 2:}$$

$\nu$ in the condition 1 is a parameter for setting the ratio of normal patterns to be present in the vicinity of the boundary of a group of normal patterns. Therefore, the range of the parameter $\nu$ is $0<\nu\leq1$. For example, the parameter initialization unit 105 presets $\nu=0.1$. $\Sigma[i=1 \text{ to } N]$ means to obtain a sum total by incrementing i by 1 from 1 to N (i=1, i=2, i=3, ..., i=N). The parameter initialization unit 105 records the N initialized coefficients $\{\alpha_i\}$ as classifier parameters 106.

In step S204, a specific category target function setting unit 107 sets a target function $J_p(\theta)$ relating to specific category data, i.e., normal patterns. $\theta$ means a predetermined parameter which should be optimized. In the present exemplary embodiment, since $\theta$ is equal to the coefficient $\{\alpha_i\}$, the specific category target function setting unit 107 sets the target function $J_p(\{\alpha_i\})$ represented by the following formula (1).

$$J_p(\{\alpha_i\}) = -\frac{1}{2}\sum_{n=1}^{N}\sum_{i=1}^{N}\alpha_n\alpha_i k(x_i, x_n) \text{ s.t. } 0 \leq \alpha_i \leq \frac{1}{\nu N}, \sum_{i=1}^{N}\alpha_i = 1 \quad (1)$$

In the formula (1), $x_i$ denotes the i-th normal pattern and $x_n$ denotes the n-th normal pattern. In the present exemplary embodiment, a normal pattern is the data of a 251-dimensional feature vector extracted from normal data. $k(x_i, x_n)$ is a kernel function. In the present exemplary embodiment, the kernel function represented by the following formula (2) is used.

$$k(x_i, x_n) = \exp\frac{-|x_i - x_n|^2}{2\sigma^2} \quad (2)$$

Although, in the present exemplary embodiment, what is called a gauss kernel function represented by the formula (2) is used as a kernel function, but the kernel function is not limited thereto. More specifically, other function may be used as long as $k(x_i, x_n)$ approaches 0 (zero) when $x_i$ and $x_n$ are not similar. In the present exemplary embodiment, a parameter $\sigma$ of the kernel function is preset.

The target function $J_p(\theta)$ represented by the formula (1) coincides with the target function of the above-described 1-class SVM. The learning processing of the 1-class SVM is to obtain the parameter for maximizing the target function $J_p(\theta)$, i.e., the coefficient $\{\alpha_i\}$. However, in the learning of the 1-class SVM, non-specific category data cannot be used for learning. Therefore, simply maximizing the target function $J_p(\theta)$ cannot heighten the sensitivity to learning data known to be non-specific category data (abnormal data in the present exemplary embodiment). More specifically, it is not possible to adjust the parameters of the classifier, i.e., the coefficient $\{\alpha_i\}$ so that the classifier determines as not normal an abnormal pattern known to be abnormal. In the present exemplary embodiment, therefore, a penalty term for decreasing the normality for known abnormal data is added to the target function $J_p(\theta)$. This operation heightens the sensitivity to learning data known to be non-specific category data (abnormal data in the present exemplary embodiment).

To achieve this purpose, in step S205, a non-specific category target function setting unit 108 sets the target function $J_n(\{\alpha_i\})$ relating to non-specific category data, i.e., abnormal patterns. This target function $J_n(\{\alpha_i\})$ is used to make it hard that non-specific category patterns used for learning (specifically, abnormal patterns) are determined as specific category patterns (normal patterns in the present exemplary embodiment). The target function $J_n(\{\alpha_i\})$ will be described in detail below.

The above-described 1-class SVM derives the value represented by the following formula (3) for newly input data x by using the coefficient $\{\alpha_i\}$ which maximizes the target function $J_p(\{\alpha_i\})$ represented by the formula (1). When this value is equal to or greater than zero (0), the input data x is determined as data belonging to the specific category. On the other hand, when the value is smaller than zero, the input data x is determined as data not belonging to the specific category.

$$\sum_{i=1}^{N}\alpha_i k(x_i, x) - \rho \quad (3)$$

$\rho$ in the formula (3) is a threshold value which is constant to an arbitrary input data x. Therefore, f(x) in the following formula (4) in which the threshold value $\rho$ is ignored represents the specific category likelihood for the new input data x. In other words, the larger the value of f(x), the higher the specific category data likelihood for the newly input data x.

$$f(x) = \sum_{i=1}^{N}\alpha_i k(x_i, x) \quad (4)$$

The non-specific category target function setting unit 108 sets such a target function that decreases the value of the formula (4) to non-specific category patterns used for learning, i.e., abnormal patterns used for learning. More specifically, in the present exemplary embodiment, the non-specific category target function setting unit 108 sets the target function $J_n(\{\alpha_i\})$ represented by the formula (5) as a target function relating to abnormal patterns.

$$J_n(\{\alpha_i\}) = -\frac{1}{2}\sum_{m=1}^{M}\{f(x'_m)\}^2 = -\frac{1}{2}\sum_{m=1}^{M}\left\{\sum_{i=1}^{N}\alpha_i k(x_i, x'_m)\right\}^2 \quad (5)$$

$$\text{s.t. } 0 \leq \alpha_i \leq \frac{1}{\nu N}, \sum_{i=1}^{N}\alpha_i = 1$$

$x'_m$ denotes the m-th abnormal pattern. In the present exemplary embodiment, an abnormal pattern is the data of a 251-dimensional feature vector extracted from abnormal data. Since the formula (5) gives $\alpha_i \geq 0$ and the formula (2) gives $k(x_i, x'_m)>0$, increasing the value of the target function $J_n(\{\alpha_i\})$ decreases the square mean value of the values of the formula (4) for abnormal patterns.

In the present exemplary embodiment, in processing in steps S206 and S207, a parameter correction unit 109 optimizes predetermined parameters (the coefficient $\{\alpha_i\}$ in the present exemplary embodiment) by using the target function $J_p(\{\alpha_i\})$ represented by the formula (1) and the target function $J_n(\{\alpha_i\})$ represented by the formula (5). More specifically, the parameter correction unit 109 optimizes the parameter $\{\alpha_i\}$ initialized in step S203 by maximizing the target function $J(\{\alpha_i\})$ represented by the following formula (6).

$$J(\{\alpha_i\}) = -\frac{1}{2}\sum_{n=1}^{N}\sum_{i=1}^{N}\alpha_n\alpha_j k(x_i, x_n) - \frac{\lambda}{2}\sum_{m=1}^{M}\left\{\sum_{i=1}^{N}\alpha_i k(x_i, x'_m)\right\}^2 \quad (6)$$

$$\text{s.t.} \quad 0 \le \alpha_j \le \frac{1}{vN}, \sum_{i=1}^{N}\alpha_i = 1$$

$\lambda$ denotes a positive parameter for adjusting the balance between effects of the target functions $J_p(\{\alpha_i\})$ and $J_n(\{\alpha_i\})$. The parameter correction unit 109 presets the parameter $\lambda$, for example, so as to satisfy a condition $\lambda=N/M$. Maximizing the target function $J(\{\alpha_i\})$ and accordingly optimizing the coefficient $\{\alpha_i\}$ enable obtaining the coefficient $\{\alpha_i\}$ having both the effect by the first term of the formula (6) and the effect by the second term of the formula (6). The effect by the first term of the formula (6) is an effect that the value of the formula (4) increases for specific category patterns (normal patterns in the present exemplary embodiment) and the value of the formula (4) decreases according to the deviance for patterns deviating from specific category patterns. The effect by the second term of the formula (6) is an effect that the value of the formula (4) decreases for non-specific category patterns used for learning (abnormal patterns in the present exemplary embodiment). Therefore, similar to the 1-class SVM, etc., it is possible to determine a pattern out of the distribution of specific category patterns as a pattern different from specific category patterns and to heighten the sensitivity to non-specific category patterns used for learning.

In the present exemplary embodiment, the first term of the formula (6) is an example of a specific category learning term, and the second term of the formula (6) is an example of a non-specific category learning term. For example, the first term of the formula (6) makes it possible to shift relatively toward the specific category unlikelihood the value representing the specific category likelihood for specific category data for learning relatively deviating from the distribution of specific category data for learning. For example, the second term of the formula (6) makes it possible to shift relatively toward the specific category unlikelihood the value representing the specific category likelihood for non-specific category data for learning.

In step S206, the parameter correction unit 109 corrects the coefficient $\{\alpha_i\}$ to maximize the value of the target function $J_p(\{\alpha_i\})$ represented by the formula (6). In the present exemplary embodiment, the value of the target function $J_p(\{\alpha_i\})$ is maximized by using the Sequential Minimal Optimization (SMO) method which is generally performed in the optimization of SVM parameters. In the SMO method, two arbitrary parameters to be optimized are selected and successively updated to optimize the parameters. In the present exemplary embodiment, based on the following formulas (7) to (11), the parameter correction unit 109 updates two arbitrary coefficients $\alpha_s$ and $\alpha_t$ ($s, t=1, 2, \ldots, N, s \ne t$) out of the N coefficients $\{\alpha_i\}$ recorded as the classifier parameters 106.

$$\alpha_t^{new} = \begin{cases} V, & \alpha'_t > V \\ \alpha'_t, & U \le \alpha'_t \le V \\ U, & \alpha'_t < U \end{cases} \quad (7)$$

$$\alpha_s^{new} = \alpha_s + \alpha_t - \alpha_t^{new} \quad (8)$$

$$U = \max\left(0, \alpha_s + \alpha_t - \frac{1}{vN}\right) \quad (9)$$

$$V = \min\left(\frac{1}{vN}, \alpha_s + \alpha_t\right) \quad (10)$$

$$\alpha'_t = \alpha_t + \frac{f(x_s) - f(x_t) + \lambda\sum_{m=1}^{M}[\{k(x_s, x'_m) - k(x_t - x'_m)\}f(x'_m)]}{k(x_s, x_s) + k(x_t, x_t) - 2k(x_s, x_t) + \lambda\sum_{m=1}^{M}\{k(x_s, x'_m) - k(x_t - x'_m)\}^2} \quad (11)$$

The two coefficient $\alpha_s$ and $\alpha_t$ selected in this processing may be arbitrary. However, to efficiently update them, it is preferable to select such a combination of s and t that provides a large absolute value of the second term of the right-hand side of the formula (11).

In step S207, based on the coefficient $\{\alpha_i\}$ corrected in step S206, the parameter correction unit 109 determines whether the learning of the classifier has converged. When the parameter correction unit 109 determines that the learning of the classifier has not converged (NO in step S207), the processing returns to step S206. Then, the parameter correction unit 109 repeats the processing in steps S206 and S207 until the learning of the classifier is determined to have converged, to optimize the coefficient $\{\alpha_i\}$. The parameter correction unit 109 may determine whether the learning of the classifier has converged, for example, by determining whether the correction of the coefficient $\{\alpha_i\}$ has converged. In the present exemplary embodiment, when the maximum value of the absolute value of the numerator of the second term of the right-hand side of the formula (11) is equal to or smaller than a predetermined value (e.g., $10^{-3}$ or less) in all combinations of s and t, the parameter correction unit 109 determines that the learning of the classifier has converged.

When the parameter correction unit 109 determines that the learning of the classifier has converged (YES in step S207), the processing proceeds to step S208. In step S208, a classifier data output unit 110 outputs the classifier data obtained from the learning result to the outside. More specifically, the classifier data output unit 110 outputs as the classifier data a list of sets of the optimized coefficient $\{\alpha_i\}$ with $\alpha_i>0$ and the normal pattern $x_i$ corresponding to the coefficient $\{\alpha_i\}$. This list is generated based on the coefficients $\{\alpha_i\}$ stored as the classifier parameters 106 and the normal patterns recorded in the learning pattern storage unit 104.

For example, assume that there are $N_{SV}$ coefficients $\{\alpha_i\}$ which exceed 0 (zero) among the coefficients $\{\alpha_i\}$. In this case, the classifier data output unit 110 outputs $N_{SV}$ coefficients $\{\alpha_{(SV)i}\}$ ($i=1, 2, \ldots, N_{SV}$) and $N_{SV}$ normal patterns $\{x_{(SV)i}\}$ ($i=1, 2, \ldots, N_{SV}$) respectively corresponding to the coefficients $\{\alpha_{(SV)i}\}$.

The classifier data output unit 110 can calculate the maximum value max $\{f(x'_m)\}$ of the values of the formula (4) for M abnormal patterns recorded in the learning pattern storage unit 104 by using the final coefficients $\{\alpha_i\}$, and output max $\{f(x'_m)\}$ as a threshold value Vth of the classifier. In this case, the threshold value Vth of the classifier can also be included in the classifier data.

In this way, the present exemplary embodiment makes it possible to train the classifier so as to lower the specific category likelihood for known non-specific category patterns while achieving similar functions to the 1-class SVM classifier.

In the present exemplary embodiment, to lower the specific category likelihood for non-specific category patterns, a term that reduces the sum total of the squares of the specific category likelihood is added to the target function of the 1-class SVM (refer to the second term of the right-hand side of the formula (6)). However, if a term that lowers the specific category likelihood for non-specific category patterns is used, it is not necessary to use the term that reduces the sum total of the squares of the specific category likelihood for non-specific category patterns. For example, a term that reduces the simple sum total of the specific category likelihood for non-specific category patterns may be added to the target function of the 1-class SVM.

Next, an example of a pattern classification method for detecting abnormalities in the monitoring area based on a moving image captured by the monitoring camera by using a classifier trained as described above, is described.

Figure 3:
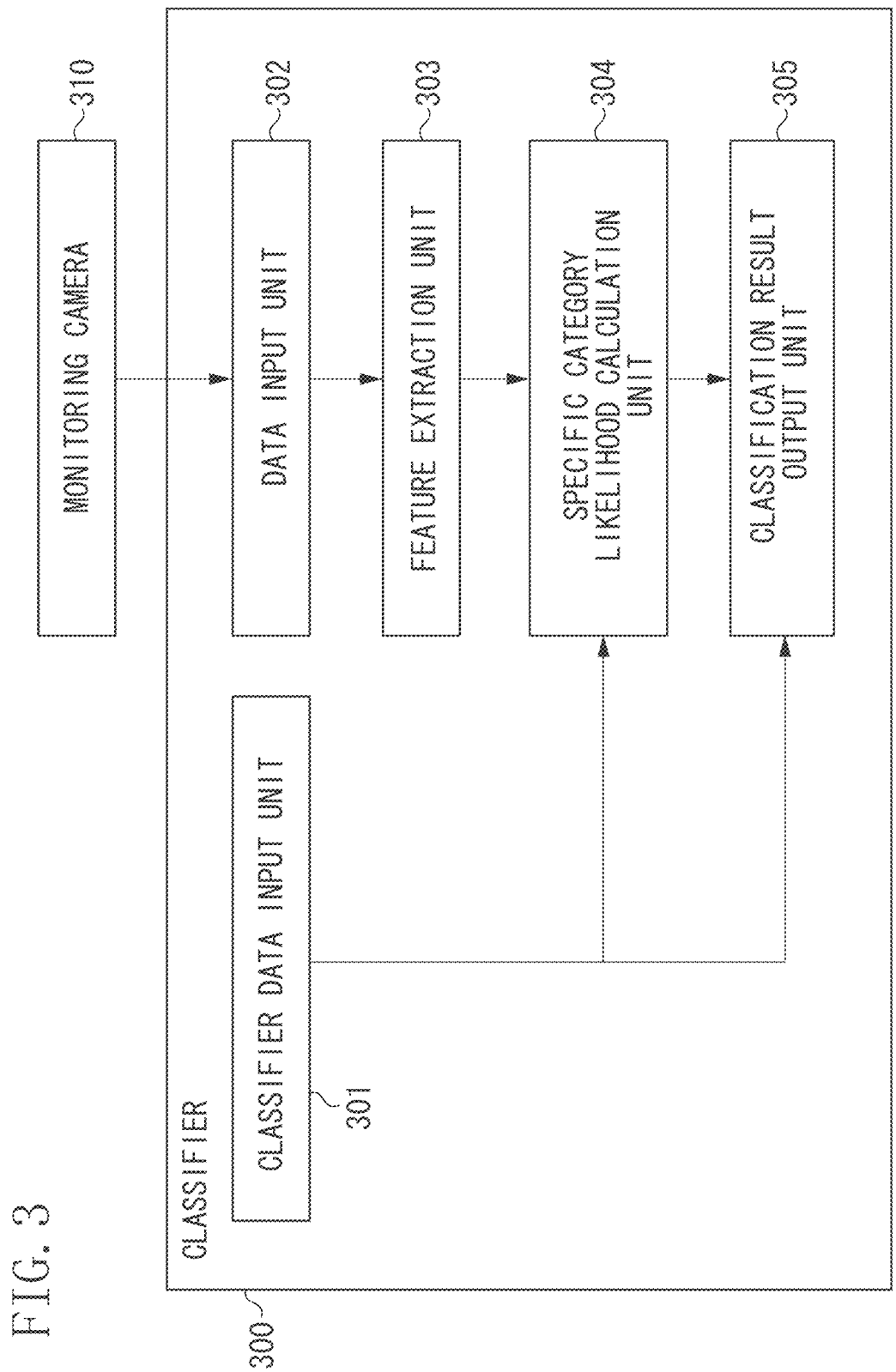
FIG. 3 is a block diagram illustrating a first example of a configuration of a classifier.
Figure 4:
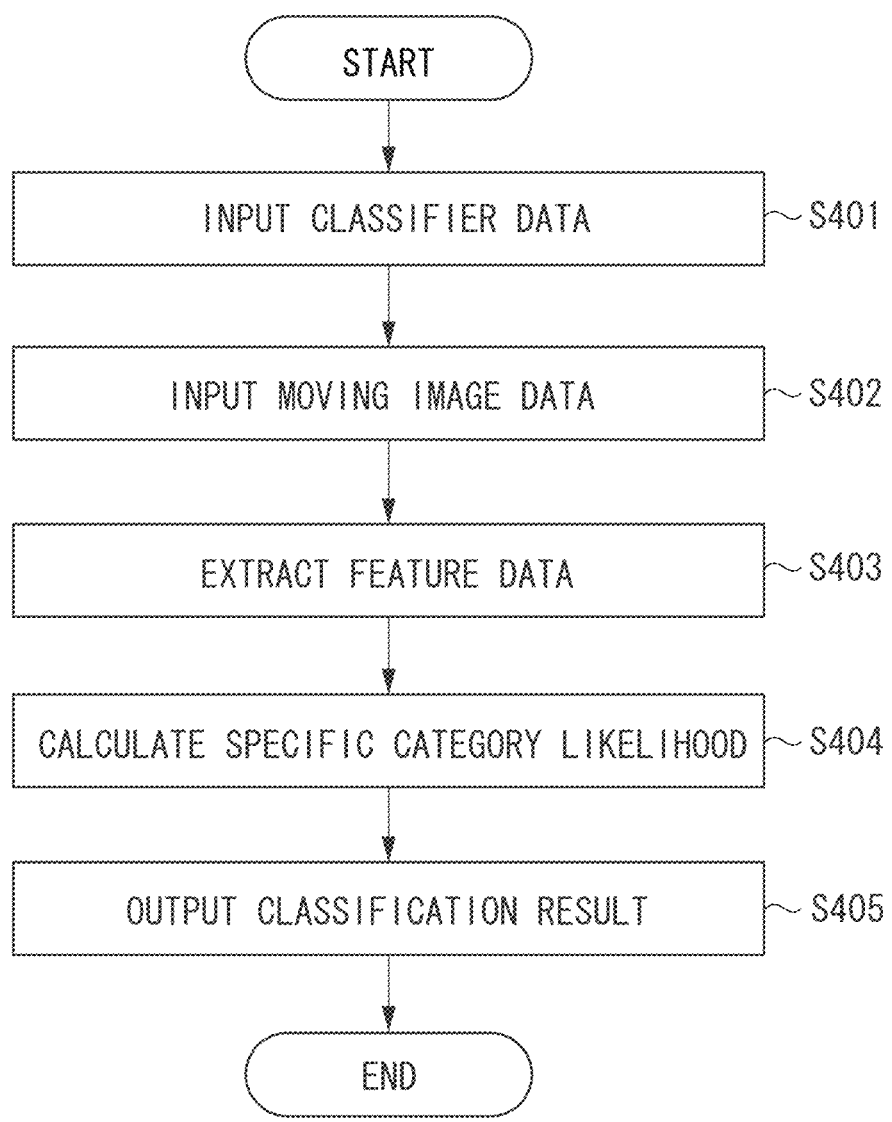
FIG. 4 is a flowchart illustrating a first example of processing performed by the classifier.

FIG. 3 illustrates an example of a functional configuration of a classifier 300. FIG. 4 is a flowchart illustrating an example of processing performed by the classifier 300. An example of a pattern classification method according to the present exemplary embodiment will be described below with reference to FIGS. 3 and 4.

In step S401, the classifier data input unit 301 inputs the classifier data output in step S208 illustrated in FIG. 2. More specifically, the classifier data input unit 301 inputs $N_{SV}$ coefficients $\{\alpha_{(SV)i}\}$ (i=1, 2, . . . , $N_{SV}$) and $N_{SV}$ normal patterns $\{x_{(SV)i}\}$ (i=1, 2, . . . , $N_{SV}$) respectively corresponding to the coefficients $\{\alpha_{(SV)i}\}$, and the threshold value Vth of the classifier. Input forms of these data are not limited to particular forms. For example, the classifier data input unit 301 is able to input these data from the classifier data output unit 110 via a communication line. When the classifier data output unit 110 transmits these data to an external apparatus, the classifier data input unit 301 is able to input these data from the external apparatus via a communication line. When the classifier data output unit 110 stores these data in a portable storage medium, the classifier data input unit 301 is able to read these data from the portable storage medium via a communication line.

The $N_{SV}$ coefficients $\{\alpha(SV)i\}$ and the $N_{SV}$ normal patterns $\{x_{(SV)i}\}$ are used by the specific category likelihood calculation unit 304 (described below). Therefore, the $N_{SV}$ coefficients $\{\alpha_{(SV)i}\}$ and the $N_{SV}$ normal patterns $\{x_{(SV)i}\}$ are transmitted to the specific category likelihood calculation unit 304. The threshold value Vth of the classifier is used by an classification result output unit 305 (described below). Therefore, the threshold value Vth of the classifier is transmitted to the classification result output unit 305.

In step S402, the data input unit 302 inputs data of a moving image captured by the monitoring camera 310 as a moving image for determining whether an abnormality exists. The monitoring camera 310 can be implemented by using a known technique. Similar to the description made in step S401, the input form of moving image data is not limited to particular forms.

In step S403, the feature extraction unit 303 extracts feature data from the moving image data input in step S402. In the present exemplary embodiment, similar to the operation performed in step S202 illustrated in FIG. 2, the feature extraction unit 303 extracts the CHLAC. Thus, feature extraction is performed on the moving image data input in step S402. A 251-dimensional feature vector is obtained in the present exemplary embodiment.

In step S404, the specific category likelihood calculation unit 304 calculates the specific category likelihood based on the following formula (12) by using the classifier data input in step S401 and the feature vector data (feature vectors) extracted in step S403.

$$\sum_{i=1}^{N_{SV}} \alpha_{(SV)i} k(x_{(SV)i}, x) \quad (12)$$

x denotes the 251-dimensional feature vector extracted in step S403. In the present exemplary embodiment, the specific category likelihood represents the normality likelihood of the moving image data input in step S402.

In step S405, the classification result output unit 305 compares the specific category likelihood calculated in step S404 with the threshold value Vth of the classifier input in step S401. When the specific category likelihood is equal to or greater than the threshold value Vth, the classification result output unit 305 determines that the feature data of the input moving image is of a specific category pattern and that no abnormal situation has occurred in the input moving image. On the other hand, when the specific category likelihood is smaller than the threshold value Vth, the classification result output unit 305 determines that the feature data of the input moving image is not of a specific category pattern and that an abnormal situation has occurred in the input moving image.

The classification result output unit 305 outputs the result of the determination to the outside. The output form of the result of the determination is not limited to particular forms. For example, at least any one of display on a computer display, transmission to an external apparatus, and storage in an internal or external storage medium can be employed as an output form. This completes processing of the pattern classification method according to the present exemplary embodiment.

The above-described processing heightens the possibility of being able to detect, in detecting abnormalities in the moving image captured by the monitoring camera 310, not only patterns deviating from normal patterns but also patterns similar to known abnormal patterns used for the learning of the pattern classifier, as abnormalities.

In the present exemplary embodiment, the processing of the pattern classification method for one moving image has been described above. However, repeating the processing in steps S402 to S405 illustrated in FIG. 4 enables performing processing for continuously detecting abnormalities on the moving image captured by the monitoring camera 310. In the present exemplary embodiment, the threshold value Vth calculated during the learning of the classifier is used as a threshold value for the specific category likelihood (refer to the descriptions of step S208 illustrated in FIG. 2). However, the threshold value for the specific category likelihood is not limited thereto. For example, to further improve the sensitivity to abnormalities, it is only necessary to employ a larger threshold value larger than the threshold value calculated during the learning of the classifier.

Figure 5:
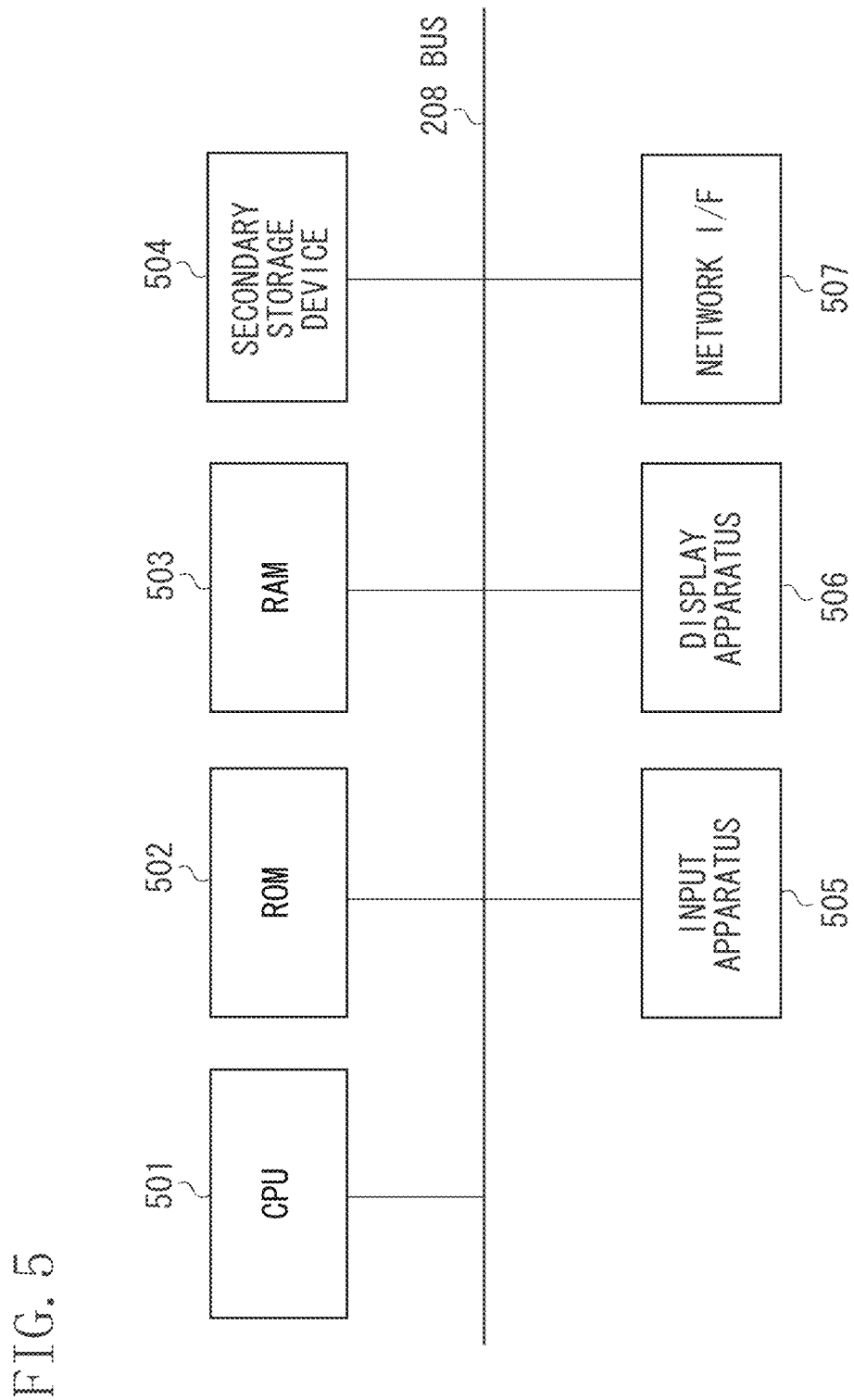
FIG. 5 is a block diagram illustrating a hardware configuration of the classifier generation apparatus and the classifier.

An example of a hardware configuration of the classifier generation apparatus 100 and the classifier 300 will be described below with reference to FIG. 5. As long as the above-described functions can be achieved, the hardware configuration of the classifier generation apparatus 100 and the classifier 300 is not limited to the configuration illustrated in FIG. 5.

A central processing unit (CPU) 501 executes an instruction according to a program stored in a read only memory (ROM) 502 and a random access memory (RAM) 503.

The ROM 502 is a nonvolatile memory for storing programs for performing processing of the above-described flowchart, and programs and data required for other controls.

The RAM 503 is a volatile memory for storing frame image data and temporary data such as a result of the identification of a subject.

A secondary storage device 504 such as a hard disk drive, a flash memory, and other data rewritable secondary storage device stores image information and various setting contents. These pieces of information are transmitted to the RAM 503, and used when the CPU 501 executes a program or used as data.

An input device 505 such as a keyboard, a mouse allows input of an instruction from a user.

A display apparatus 506 such as a cathode ray tube (CRT) and a liquid crystal display (LCD) displays processing results to the user.

A network interface (I/F) 507 such as a modem and a local area network (LAN) connects with a network such as the Internet and intranet.

A bus 508 connects the above-described units so that they can communicate with each other. Each unit mutually inputs and outputs data via the bus 508.

As described above, the present exemplary embodiment performs the following two pieces of processing when learning parameters of the classifier. First, the specific category likelihood of normal patterns for learning relatively deviating from the group of normal patterns for learning is lowered relatively to the specific category likelihood of normal patterns for learning not relatively deviating from the group of normal patterns for learning. Second, the specific category likelihood of abnormal patterns for learning is lowered relatively to the specific category likelihood of the group of normal patterns for learning. Therefore, it becomes possible to train the classifier capable of modeling a range of normal patterns while increasing the sensitivity to abnormal patterns for learning. Therefore, even if there is a small number of abnormal patterns for learning, unknown abnormal data input to the classifier can be classified with a high probability. Further, using the classifier enables achieving pattern classification in which patterns deviating from the range of normal patterns can be determined as not normal while maintaining the sensitivity to abnormal patterns used for learning.

Next, a second exemplary embodiment will be described. In the learning method of the classifier according to the first exemplary embodiment, preset values are used for parameters $\nu$, $\sigma$, and $\lambda$ other than the coefficients $\{\alpha_i\}$. The parameter $\lambda$ is a parameter included in the condition 1 used by the parameter initialization unit 105. The parameter $\sigma$ is a parameter $\sigma$ of the kernel function represented by the formula (2). The parameter $\lambda$ is a positive parameter for adjusting the balance between effects of the target functions $J_p(\{\alpha_i\})$ and $J_n(\{\alpha_i\})$. However, the present exemplary embodiment suitably searches also for these parameters. In this way, the present exemplary embodiment differs from the first exemplary embodiment mainly in the method for deriving the parameters $\nu$, $\sigma$, and $\lambda$. Therefore, in the description of the present exemplary embodiment, units and steps identical to those according to the first exemplary embodiment are assigned the same reference numerals as those in FIGS. 1 to 5, and detailed descriptions thereof will be omitted. In the following descriptions, parameters other than the coefficient $\{\alpha_i\}$ are referred to as hyper parameters as needed.

Figure 6:
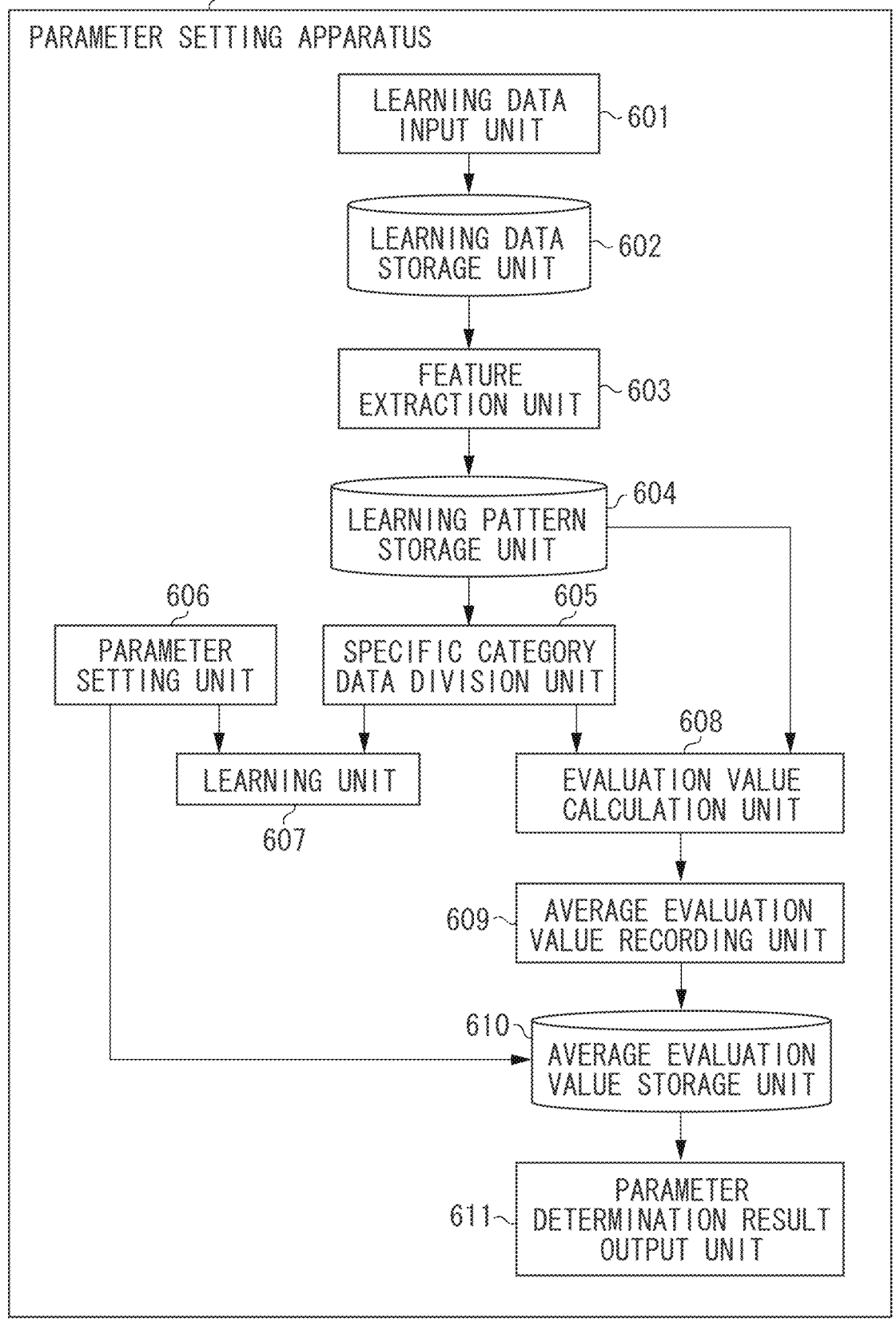
FIG. 6 is a block diagram illustrating a configuration of a parameter setting apparatus.
Figure 7:
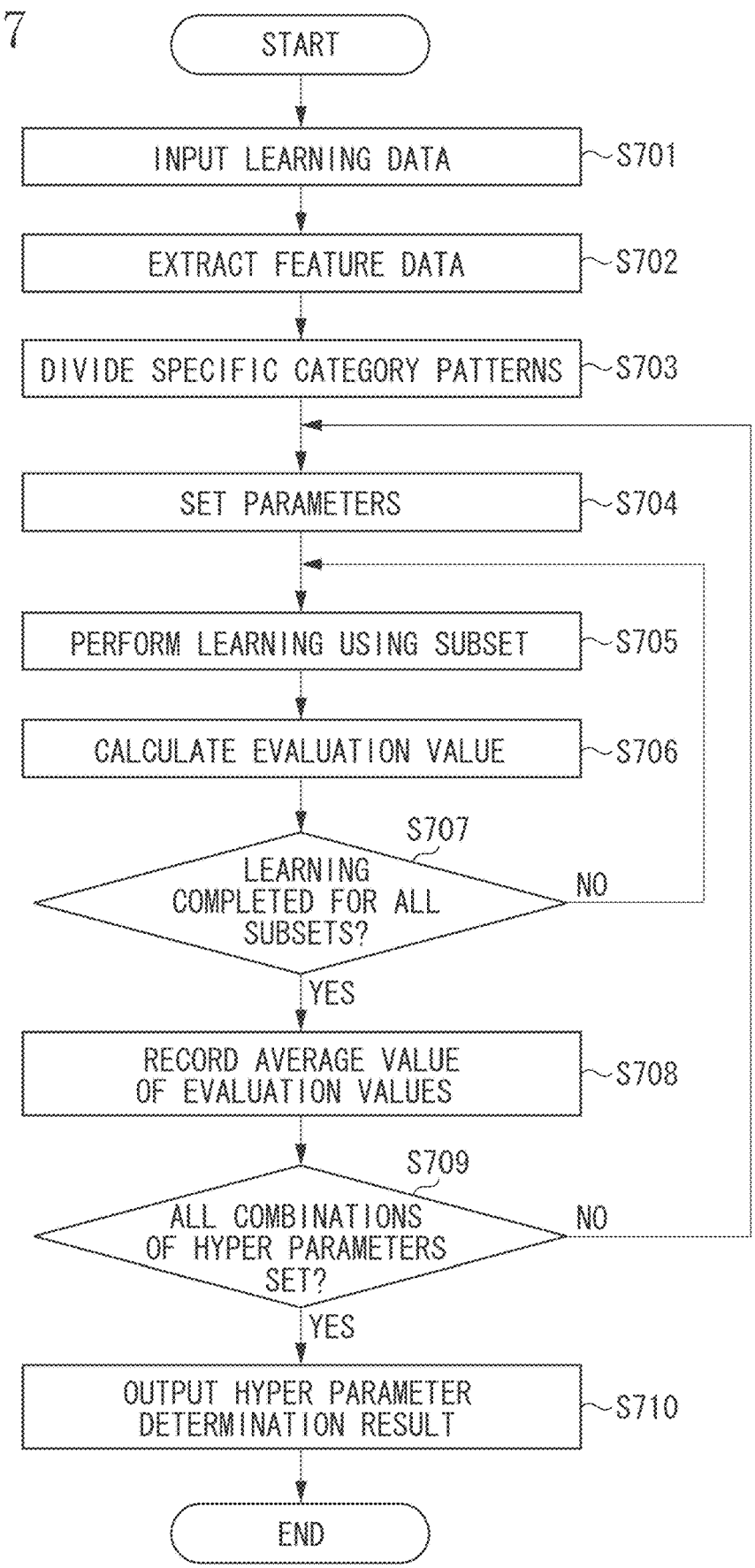
FIG. 7 is a flowchart illustrating processing by the parameter setting apparatus.

In the present exemplary embodiment, hyper parameters include the parameters $\nu$, $\sigma$, and $\lambda$. For these hyper parameters $\nu$, $\sigma$, and $\lambda$, suitable values can be set based on the framework of what is called the cross-validation method. FIG. 6 illustrates an example of a functional configuration of a parameter setting apparatus 600. FIG. 7 is a flowchart illustrating an example of processing performed by the parameter setting apparatus 600. An example of a parameter setting method according to the present exemplary embodiment will be described below with reference to FIGS. 6 and 7.

In step S701, the learning data input unit 601 inputs a large number of normal data and at least one piece of abnormal data as learning data, and records them in the learning data storage unit 602. The processing in step S701 is similar to the processing in step S201 illustrated in FIG. 2, and detailed descriptions thereof will be omitted.

In step S702, the feature extraction unit 603 extracts feature data from respective pieces of learning data recorded in the learning data storage unit 602 in step S701, associates the extracted feature data with the extraction source learning data, and records them in the learning pattern storage unit 604. In the present exemplary embodiment, the feature extraction unit 603 extracts, for example, the CHLAC discussed in Japanese Patent Application Laid-Open No. 2006-079272 as feature data. The processing in step S702 is similar to the processing in step S202 illustrated in FIG. 2, and detailed description thereof will be omitted.

In step S703, a specific category data division unit 605 divides only a plurality of specific category patterns (normal patterns in the present exemplary embodiment) into a plurality of sets. At that time, it is desirable to use all of the normal data input in step S701. However, it is not necessary to use all of the normal data input in step S701. Further, a plurality of normal patterns can be divided into an arbitrary number of sets. In the present exemplary embodiment, an example case where the specific category data division unit 605 divides a plurality of normal patterns into five sets, will be described.

In step S704, a parameter setting unit 606 sets the hyper parameters $\nu$, $\sigma$, and $\lambda$. More specifically, for each of the hyper parameters $\nu$, $\sigma$, and $\lambda$, the parameter setting unit 606 prepares a plurality of preset values and sets one of combinations of the preset values. More specifically, for example, the parameter setting unit 606 prepares nine preset values $\{0.1, 0.2, \ldots, 0.9\}$ for the hyper parameter $\nu$. For example, the parameter setting unit 606 prepares five preset values $\{0.1, 0.32, 1, 3.2, 10\}$ for the hyper parameter $\sigma$. For example, the parameter setting unit 606 prepares 10 preset values $\{1, 2, \ldots, 10\}$ for the hyper parameter $\lambda$. In this case, there is a total of ($9 \times 5 \times 10 =$) 450 combinations of the hyper parameters $\nu$, $\sigma$, and $\lambda$. In the present exemplary embodiment, the parameter setting unit 606 sets one (e.g., $\nu = 0.1$, $\sigma = 0.1$, $\lambda = 1$) of the 450 combinations. The parameter setting unit 606 transmits the set hyper parameters $\nu$, $\sigma$, and $\lambda$ to the learning unit 607. The parameter setting unit 606 records the values of the hyper parameters $\nu$, $\sigma$, and $\lambda$ in the average evaluation value storage unit 610 in an associated manner.

In step S705, the learning unit 607 performs the learning using a subset (a plurality of division sets generated in step S703 excluding one set) and a plurality of abnormal patterns. In the present exemplary embodiment, normal patterns are divided into five sets. Therefore, the learning unit 607 performs the learning using four division sets of normal patterns and all patterns of abnormal patterns. The learning is performed based on the method described in steps S206 and S207 illustrated in FIG. 2 by using the hyper parameters set in step S704. The classifier data is obtained from the learning result. In the example described in the first exemplary embodiment, $N_{SV}$ coefficients $\{\alpha_{(SV)i}\}$ (i=1, 2, ..., $N_{SV}$) and $N_{SV}$ normal patterns $\{x_{(SV)i}\}$ (i=1, 2, ..., $N_{SV}$) respectively corresponding to the coefficients $\{\alpha_{(SV)i}\}$ are obtained as the classifier data.

In step S706, an evaluation value calculation unit 608 calculates an evaluation value of the learning result based on the classifier data obtained in step S705, the one set of normal patterns not used for learning in step S705, and abnormal patterns used for learning. More specifically, the evaluation value calculation unit 608 calculates the specific category likelihood for one set of normal patterns not used for learning and for all abnormal patterns used for learning, based on the formula (12). Then, using the highest specific category likelihood out of the specific category likelihood for abnormal patterns as a reference likelihood, the evaluation value calculation unit 608 calculates the ratio of patterns having the specific category likelihood higher than the reference likelihood out of one set of normal patterns not used for learning. This ratio serves as the evaluation value for the learning result. The evaluation value calculation unit 608 transmits the evaluation value of the learning result to the average evaluation value recording unit 609.

In step S707, the parameter setting apparatus 600 determines whether the calculation of the evaluation value of the learning result is completed for all sets that can be taken as a subset (a plurality of division sets generated in step S703 excluding one set). When the calculation of the evaluation value of the learning result is not completed for all sets that can be taken as a subset (NO in step S707), the processing returns to step S705. In step S705, the learning unit 607 performs the learning using a subset not completed the calculation of the evaluation value of the learning result and a plurality of abnormal patterns. Then, the learning unit 607 repetitively performs the processing in steps S705 to S707 until the calculation of the evaluation value of the learning result is completed for all sets that can be taken as a subset.

When the calculation of the evaluation value of the learning result is completed for all sets that can be taken as a subset (YES in step S707), the processing proceeds to step S708. In the present exemplary embodiment, since normal patterns are divided into five sets, there are five different subsets (five different combinations of sets) with which the learning and the calculation of the evaluation value of the learning result are performed. Therefore, for all of the five patterns, the learning unit 607 performs the learning and the calculation of the evaluation value of the learning result.

In step S708, the average evaluation value recording unit 609 calculates the average value of the evaluation values of the learning results for all subsets (all combinations of sets). Then, the evaluation value recording unit 608 associates the average value of the evaluation values of the learning results for all subsets (all combinations of sets) with the values of the hyper parameters $\nu$, $\sigma$, and $\lambda$ set in step S704, and records it in the average evaluation value storage unit 610.

In step S709, the parameter setting apparatus 600 determines whether all combinations of the hyper parameters $\nu$, $\sigma$, and $\lambda$ are set. When the parameter setting apparatus 600 determines that not all of the hyper parameters $\nu$, $\sigma$, and $\lambda$ are set, (NO in step S709), the processing returns to step S704. In step S704, the parameter setting unit 606 sets the unselected hyper parameters $\nu$, $\sigma$, and $\lambda$. Then, the parameter setting apparatus 600 repeats the processing in step S704 to S709 until all combinations of the hyper parameters $\nu$, $\sigma$, and $\lambda$ are set and the calculation of the average value of the evaluation values of the learning results is completed for all combinations of the hyper parameters $\nu$, $\sigma$, and $\lambda$.

When the calculation of the average value of the evaluation values of the learning results is completed for all combinations of the hyper parameters $\nu$, $\sigma$, and $\lambda$ as described above (YES in step S709), the processing proceeds to step S710. In step S710, the parameter setting apparatus 600 repeats the processing in steps S704 to S708 for each of the 450 different combinations in the case of the above-described example of setting values of the hyper parameters (refer to the descriptions of step S704). As a result, the evaluation value recording unit 608 records the values of the 450 different hyper parameters and the average value of the evaluation values of the learning results corresponding to the values of the learning results in the average evaluation value storage unit 610.

In step S710, the parameter determination result output unit 611 selects a combination of the hyper parameters $\nu$, $\sigma$, and $\lambda$ which provides the highest average value of the evaluation values of the learning results out of all combinations of the hyper parameters $\nu$, $\sigma$, and $\lambda$ recorded in the average evaluation value storage unit 610. Then, the parameter determination result output unit 611 outputs the selected combination of the hyper parameters $\nu$, $\sigma$, and $\lambda$ to the outside as a determination result of the hyper parameters. The output form of the determination result of the hyper parameters is not limited to particular forms. For example, at least any one of display on a computer display, transmission to an external apparatus, and storage in an internal or external storage medium can be employed as an output form. This completes the processing of the parameter setting method according to the present exemplary embodiment.

The above-described processing enables determining the suitable hyper parameters $\nu$, $\sigma$, and $\lambda$ and processing the classifier learning method according to the flowchart illustrated in FIG. 2 by using the determined hyper parameters $\nu$, $\sigma$, and $\lambda$.

As described above, in the present exemplary embodiment, the specific category data division unit 605 divides only normal patterns into a plurality of sets and does not divide abnormal patterns. Then, parameter setting apparatus 600 performs the learning by using a subset (a plurality of division sets excluding one set), abnormal patterns, and candidates of the hyper parameters, and derives an evaluation value of the learning result. The parameter setting apparatus 600 derives such an evaluation value of the learning result for all sets that can be taken as a subset and derives an average value of the evaluation values of the learning results. The parameter setting apparatus 600 performs such derivation of the average value of the evaluation values of the learning results for all candidates of the hyper parameters. Then, the parameter setting apparatus 600 selects the hyper parameters providing the highest average value of the evaluation values of the learning results, out of the candidates of the hyper parameters. Therefore, even if there is a small number of abnormal patterns, hyper parameters can be suitably set.

The parameter setting apparatus 600 according to the present exemplary embodiment can be included in the classifier generation apparatus 100 according to the first exemplary embodiment. In this case, the learning data input unit 601, the learning data storage unit 602, the feature extraction unit 603, and the learning pattern storage unit 604 can be respectively implemented by the learning data input unit 101, the learning data storage unit 102, the feature extraction unit 103, and the learning pattern storage unit 104 illustrated in FIG. 1. Therefore, the learning data input unit 601, the learning data storage unit 602, the feature extraction unit 603, and the learning pattern storage unit 604 are not necessarily provided.

In the general cross-validation method, unlike the method according to the present exemplary embodiment, non-specific category patterns are also divided and parts of the patterns are used for the evaluation of the learning result. In this case, however, if there is a small number of non-specific category patterns, variations in the division method causes a problem of the difficulty in stably determining the hyper parameters ν, σ, and λ. This may be a problem when using as non-specific category data a rare phenomenon such as a moving image of an abnormal situation captured by the monitoring camera 310. On the other hand, the method according to the present exemplary embodiment enables stable determination of the hyper parameters ν, σ, and λ as long as a sufficient number of specific category patterns exist even if there is a small number of non-specific category patterns. If the learning by general SVM is applied to a method similar to that according to the present exemplary embodiment, the method may possibly select such hyper parameters with which only non-specific category patterns used for learning are determined as not specific category data and all other parameters are determined as specific category data. On the other hand, the classifier learning method according to the first exemplary embodiment performs regularization by lowering the specific category likelihood for specific category patterns to lower the specific category likelihood of non-specific category patterns. Therefore, in the present exemplary embodiment, the learning is performed based on the classifier learning method according to the first exemplary embodiment, and the evaluation value of the learning result is calculated. Training the classifier so that the specific category likelihood for non-specific category patterns may be lowered as a framework of regularization enables stable selection of the hyper parameters even if there is a small number of non-specific category patterns used for learning. However, for example, if a large number of non-specific category patterns of various types are available, suitable hyper parameters ν, σ, and λ can be set through the general cross-validation method.

Next, a third exemplary embodiment will be described. In the first and the second exemplary embodiments, an example case has been described where an extended version of a target function for learning the parameters of the classifier using a 1-class SVM is used as a target function for learning the parameters of the classifier. On the other hand, in the present exemplary embodiment, an extended version of Kullback-Leibler Importance Estimation Procedure (KLIEP) discussed in Susumu Sugiyama, "New Approach to Machine Learning Based on Density Ratio", Statistical Mathematics, Vol. 58, No. 2, pp. 141-155, 2010 is used as a target function for learning the parameters of the classifier. In this way, the present exemplary embodiment differs from the first exemplary embodiment mainly in the configuration and processing due to a different classifier and a different target function for learning the parameters of the classifier. Therefore, in the description of the present exemplary embodiment, units and steps identical to those in the first and the second exemplary embodiments are assigned the same reference numerals as those in FIGS. 1 to 7, and detailed descriptions thereof will be omitted.

Similar to the first exemplary embodiment, in the present exemplary embodiment, an example method for performing the learning of a pattern classifier for detecting abnormalities in a monitoring area based on a moving image captured by a monitoring camera, will be described. Also in the following description of the present exemplary embodiment, feature vectors extracted from normal data and recorded in the learning pattern storage unit 104 are referred to as normal patterns as needed, and feature vectors extracted from abnormal data and recorded in the learning pattern storage unit 104 are referred to as abnormal patterns as needed.

An example of a functional configuration of the classifier generation apparatus 100 and an example of processing performed by the classifier generation apparatus 100 are similar to those illustrated in FIGS. 1 and 2, respectively, and are different in the processing relating to the target functions. Further, an example of a functional configuration of the classifier 300 and an example of processing performed by the classifier 300 are similar to those illustrated in FIGS. 3 and 4, respectively, and are different in the processing relating to the feature category likelihood. For units and steps different from the first exemplary embodiment, an example of a classifier learning method and an example of a pattern classification method according to the present exemplary embodiment will be described with reference to FIGS. 1 to 4.

In the present exemplary embodiment, a target function in the learning of the pattern classifier for detecting abnormal patterns based on KLIEP is used as a target function relating to normal patterns (specific category data) set by the specific category target function setting unit 107 in step S204. Therefore, in the present exemplary embodiment, the specific category target function setting unit 107 sets a target function $J_p(\{\alpha_i\})$ represented by the following formula (13).

$$J_p(\{\alpha_i\}) = \sum_{n=1}^{N_n} \log\left(\sum_{i=1}^{b} \alpha_i \phi_i(x_n)\right) \quad \text{s.t.} \quad \alpha_i \geq 0, \sum_{j=1}^{N_d} \sum_{i=1}^{b} \alpha_i \phi_i(x''_j) = N_d \tag{13}$$

In the present exemplary embodiment, the specific category target function setting unit 107 divides N normal patterns into two different sets, i.e., $N_n$ and $N_d$ normal patterns ($N_n + N_d = N$). Referring to the formula (13), $x_n$ denotes the n-th normal pattern vector included in the $N_n$ sets, $x''_j$ denotes the j-th normal pattern vector included in the $N_d$ sets, and $\varphi_i(x)$ denotes a basis function. In the present exemplary embodiment, the basis function $\varphi_i(x)$ represented by the following formula (14) is used assuming $b=N_d$.

$$\phi_i(x) = \exp\frac{-|x''_i - x|^2}{2\sigma^2} \tag{14}$$

In KLIEP, obtaining the coefficient $\{\alpha_i\}$ which maximizes the target function $J_p(\{\alpha_i\})$ represented by the formula (13) will train the pattern classifier. The specific category likelihood in KLIEP is represented by f(x) represented by the following formula (15).

$$f(x) = \sum_{i=1}^{b} \alpha_i \phi_i(x) \tag{15}$$

Similar to the formula (4), f(x) represented by the formula (15) represents that the specific category likelihood for the new input data x. More specifically, the larger the value of f(x), the higher the likelihood that the new input data x is specific category data. In the present exemplary embodiment, in step S205, the non-specific category target function setting unit 108 sets the following formula (16) as a target function $J_n(\{\alpha_i\})$ relating to non-specific category data, i.e., abnormal patterns.

$$J_n(\{\alpha_i\}) = -\frac{1}{2}\sum_{m=1}^{M}\{f(x'_m)\}^2 = -\frac{1}{2}\sum_{m=1}^{M}\left\{\sum_{i=1}^{b}\alpha_i\phi_i(x'_m)\right\}^2 \text{ s.t. } \alpha_i \geq 0, \quad (16)$$

$$\sum_{j=1}^{N_d}\sum_{i=1}^{b}\alpha_i\phi_i(x''_j) = N_d$$

As described above, in the processing in steps S206 and S207, the parameter correction unit 109 derives an optimum coefficient $\{\alpha_i\}$ by maximizing the target function $J(\{\alpha_i\})$ represented by the following formula (17) which is the sum of the formulas (13) and (16).

$$J(\{\alpha_i\}) = \quad (17)$$

$$\sum_{n=1}^{N_n}\log\left(\sum_{i=1}^{b}\alpha_i\phi_i(x_n)\right) - \frac{\lambda}{2}\sum_{m=1}^{M}\left\{\sum_{i=1}^{b}\alpha_i\phi_i(x'_m)\right\}^2 \text{ s.t. } \alpha_i \geq 0,$$

$$\sum_{j=1}^{N_d}\sum_{i=1}^{b}\alpha_i\phi_i(x''_j) = N_d$$

The target function $J(\{\alpha_i\})$ is a convex function with respect to the coefficient $\{\alpha_i\}$. Therefore, in step S206, for each of the N coefficients $\{\alpha_i\}$ recorded as the classifier parameter 106, the parameter correction unit 109 repeats the correction of the coefficient $\{\alpha_i\}$ with the slope method and the constraint satisfaction for the coefficient $\{\alpha_i\}$. This enables obtaining a global optimum solution.

In the present exemplary embodiment, for example, the first term of the formula (17) is an example of a specific category learning term, and the second term of the formula (17) is an example of a non-specific category learning term. For example, the first term of the formula (17) makes it possible to shift, relatively toward the specific category unlikelihood, the value representing the specific category likelihood for specific category data for learning relatively deviating from the distribution of specific category data for learning. Further, for example, the second term of the formula (17) makes it possible to shift, relatively toward the specific category unlikelihood, the value representing the specific category likelihood for non-specific category data for learning.

After deriving the coefficient $\{\alpha_i\}$ which maximizes the target function $J(\{\alpha_i\})$, then in step S208, the classifier data output unit 110 outputs the classifier data obtained from the learning result to the outside and outputs the learning result to the outside. This completes processing of the classifier learning method according to the present exemplary embodiment. Also in this case, the coefficient $\{\alpha_i\}$ with $\alpha_i=0$ arises because of the characteristics of KLIEP, the classifier data output unit 110 outputs as the classifier data a list of sets of the optimized coefficient $\{\alpha_i\}$ with $\alpha_i>0$ and the normal pattern $x''_i$ corresponding to the coefficient fail. For example, when there are Ns coefficients $\{\alpha_i\}$ greater than 0 (zero) among the coefficients $\{\alpha_i\}$, the classifier data output unit 110 outputs $N_S$ coefficients $\{\alpha_{(S)i}\}$ (i=1, 2, ..., $N_S$) and $N_S$ normal patterns $\{x''_{(S)i}\}$ (i=1, 2, ..., $N_S$) respectively corresponding to the coefficients $\{\alpha_{(S)i}\}$. The specific category likelihood using the result of the learning can be calculated based on the following formula (18).

$$\sum_{i=1}^{N_S}\alpha_{(S)i}\exp\frac{-|x''_{(S)i} - x|^2}{2\sigma^2} \quad (18)$$

In the present exemplary embodiment, instead of the formula (12), the formula (18) is used in step S404 illustrated in FIG. 4. When the specific category likelihood is equal to or greater than a predetermined threshold value, the classification result output unit 305 determines that the feature data of an input moving image is of specific category patterns and that no abnormal situation has occurred in the input moving image. On the other hand, when the specific category likelihood is smaller than the predetermined threshold value, the classification result output unit 305 determines that the feature data of the input moving image is not of a specific category pattern and that an abnormal situation has occurred in the input moving image.

Also in the present exemplary embodiment, hyper parameters can be selected with a similar method to that in the second exemplary embodiment. According to the present exemplary embodiment, hyper parameters include σ of the basis function $\varphi_i(x)$ represented by the formula (14) and λ of the target function $J(\{\alpha_i\})$ represented by the formula (17). Suitable hyper parameters σ and λ can be selected by setting predetermined preset values to the hyper parameters σ and λ and performing a similar cross-validation method to that according to the second exemplary embodiment.

As described above, as a target function used to learn the parameters of the classifier, not only an extended version of a target function for learning the parameters of the classifier using the 1-class SVM but also an extended version of a target function for learning the parameters of the classifier using other method, can be selected.

Next, a fourth exemplary embodiment will be described. In the first to the third exemplary embodiments, an example case has been described where a target function used to learn the parameters of what is called a 1-class classifier is extended. Different from that, in the present exemplary embodiment, an example case will be described where a target function used to learn the parameters of a 2-class classifier is extended. In the present exemplary embodiment, a case will be described where a target function used to learn the parameters of a general classifier using the logistic regression method as a 2-class classifier is extended. The present exemplary embodiment differs from the first to the third exemplary embodiments mainly in the configuration and processing due to a 2-class classifier. Therefore, in the description of the present exemplary embodiment, units and steps identical to those in the first to the third exemplary embodiments are assigned the same reference numerals as those in FIGS. 1 to 7, and detailed descriptions thereof will be omitted.

In the present exemplary embodiment, an example case will be described where a face image (still image) of a person is input and a pattern classifier for identifying whether the person having the face image is a predetermined specific person is trained.

Figure 8:
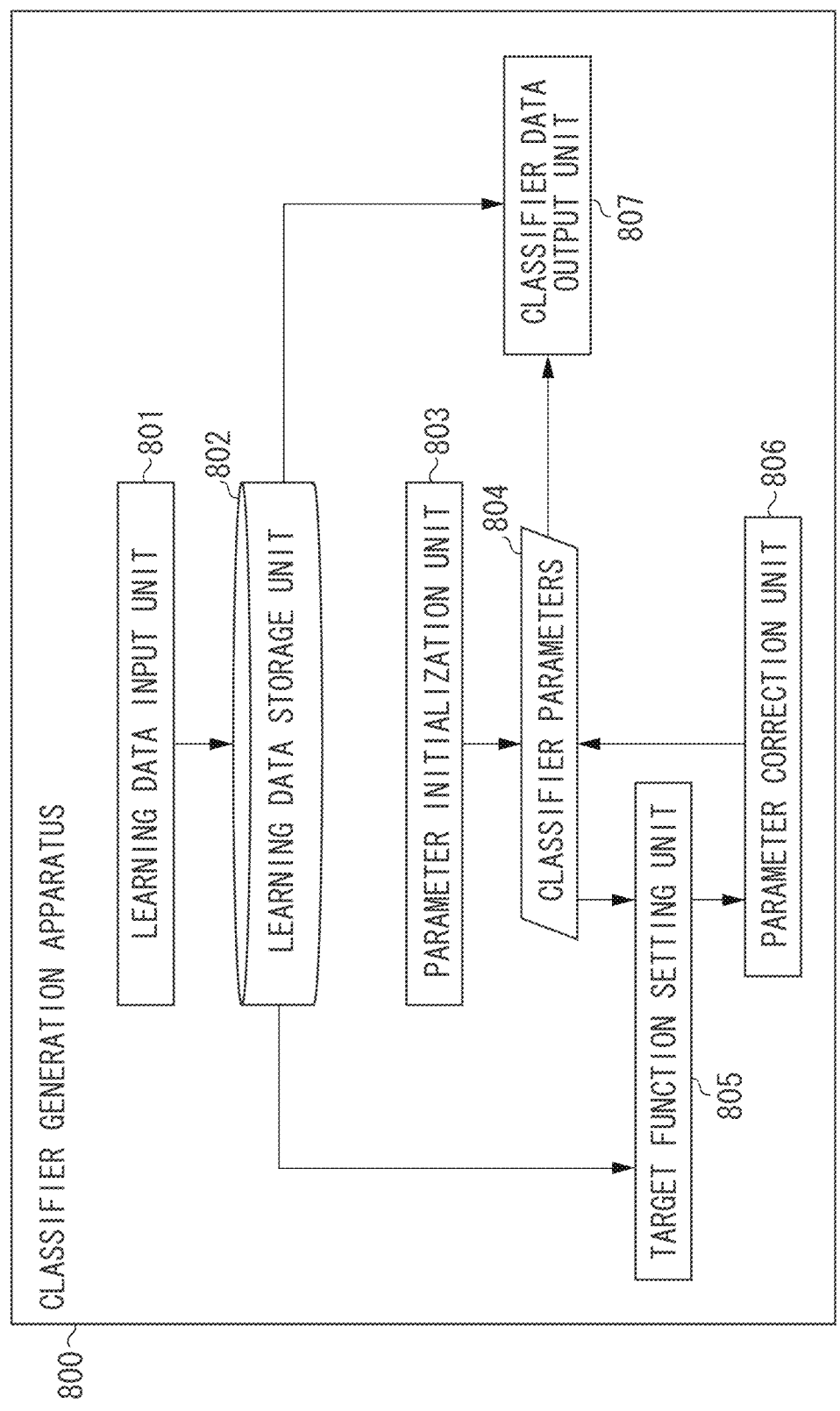
FIG. 8 is a block diagram illustrating a second example of a configuration of the classifier generation apparatus.
Figure 9:
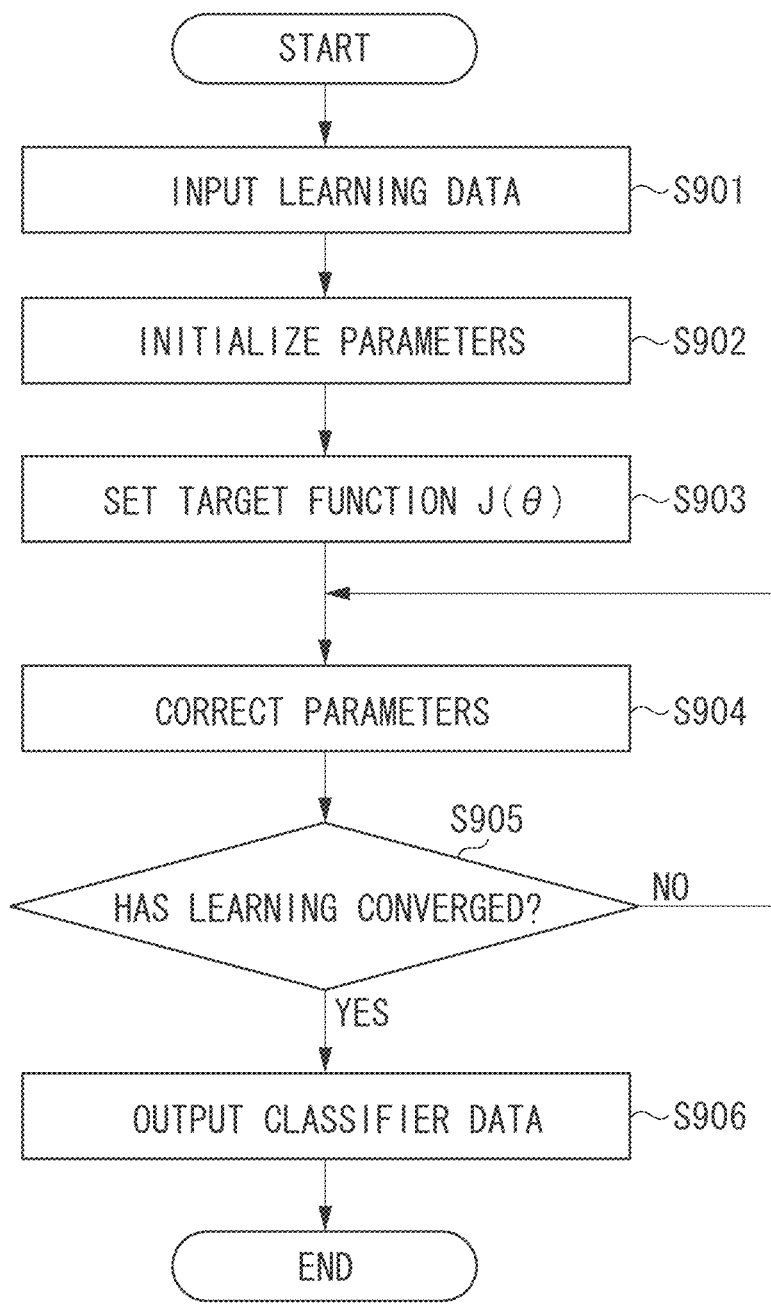
FIG. 9 is a flowchart illustrating a second example of processing performed by the classifier generation apparatus.

FIG. 8 illustrates an example of a functional configuration of a classifier generation apparatus 800. FIG. 9 is a flowchart illustrating an example of processing performed by the classifier generation apparatus 800. The classifier learning method according to the present exemplary embodiment will be described centering on differences from the first and the third exemplary embodiments, with reference to FIGS. 8 and 9.

In step S901, the learning data input unit 801 inputs a large number of learning data. The learning data is used for the learning of the classifier. In the present exemplary embodiment, face images of a large number of persons are used as a large number of learning data. More specifically, in the present exemplary embodiment, a person's face region (20×20-pixel gray scale image) clipped from an image is used as a person's face image. In the following descriptions, such an image will be simply referred to as a face image as needed. These face images include face images of predetermined specific persons and face images of arbitrary persons other than the specific persons. In the present exemplary embodiment, face images of specific persons are examples of specific category data for learning, and face images of arbitrary persons other than the specific persons are examples of non-specific category data for learning.

The learning data input unit 801 records face images of predetermined specific persons in a learning data storage unit 802 as specific category data. In the present exemplary embodiment, hereinbelow, the specific category data is referred to as specific category patterns as needed. On the other hand, the learning data input unit 801 records face images of arbitrary persons other than the predetermined specific persons in the learning data storage unit 802 as data different from the specific category data. In the present exemplary embodiment, hereinbelow, data different from the specific category data is referred to as non-specific category patterns as needed.

In the present exemplary embodiment, a total of (N+M) face images are used as learning data. The (N+M) face images include N face images of specific persons captured under various situations and M face images of arbitrary persons other than the specific persons captured under various situations. A total of (N+M) such face images are recorded in the learning data storage unit 802. Hereinbelow, the recorded learning data (face image data) is handled as a 400-dimensional vector in which pixel values of 20×20 pixels are arranged in a raster scan manner.

In step S902, a parameter initialization unit 803 initializes N coefficients $\{w_i\}$ (i=1, 2, . . . , N) which are parameters of the classifier to be trained. The coefficient $\{w_i\}$ will be described in detail below. The parameter initialization unit 803 initializes N parameters at random so that the following two conditions are satisfied.

$w_i \geq 0$            Condition 1:

$\Sigma [i=1 \text{ to } N] w_i = C$            Condition 2:

C in the condition 2 denotes a positive parameter for regularization. The smaller the value of the parameter C, the larger the effect of regularization. The parameter C is a hyper parameter predetermined in a stage before the learning. For example, the parameter initialization unit 803 is able to preset the parameter C like C=0.1N. Further, a suitable value may be selected as the value of the parameter C by using the hyper parameter setting method through the cross-validation method according to the second exemplary embodiment. The parameter initialization unit 803 records the N initialized coefficients $\{w_i\}$ as classifier parameters 804.

A target function based on the logistic regression method generally used by a 2-class classifier is separated into a term relating to specific category patterns and a term relating to non-specific category patterns, which are represented by the following formulas (19) and (20), respectively. Obtaining the coefficient $\{w_i\}$ which minimizes the value of the target function $J(\{w_i\})$ represented by the formula (19) will train the pattern classifier.

$$J(\{w_i\}) = -\sum_{n=1}^{N} \log\left\{f_\sigma\left(\sum_{i=1}^{b} w_i \phi_i(x_n)\right)\right\} - \sum_{m=1}^{M} \log\left\{1 - f_\sigma\left(\sum_{i=1}^{b} w_i \phi_i(x'_m)\right)\right\} \quad (19)$$

$$f_\sigma(a) = \frac{1}{1 + \exp(-a)} \quad (20)$$

$\varphi_i(x)$ denotes the i-th basis function out of b basis functions. In the logistic regression method, the function f(x) for obtaining the specific category likelihood is represented by the following formula (21) including the coefficient $\{w_i\}$ which minimizes the value of the target function $J(\{w_i\})$ represented by the formula (19).

$$f(x) = f_\sigma\left(\sum_{i=1}^{b} w_i \phi_i(x)\right) \quad (21)$$

In the present exemplary embodiment, the basis function $\varphi_i(x)$ in the target function $J(\{w_i\})$ represented by the formula (19) is limited to a predetermined format. Further, a constraint condition (constraint formula) relating to the coefficient $\{w_i\}$ is added to the target function having the restricted basis function $\varphi_i(x)$. More specifically, in the present exemplary embodiment, the function represented by the following formula (22) is used as basis function $\varphi_i(x)$.

$$\phi_i(x) = \exp\frac{-|x_i - x|^2}{2\sigma^2} \quad (22)$$

$x_i$ in the basis function $\varphi_i(x)$ denotes the i-th specific category pattern (i=1, 2, . . . , N) out of the N specific category patterns input in step S901. In the present exemplary embodiment, a gauss basis function centering on specific category patterns is used as the basis function $\varphi_i(x)$. However, the basis function $\varphi_i(x)$ is not limited thereto. Other basis function may be used as long as the value for data deviating from specific category patterns approaches 0 (zero).

In the present exemplary embodiment, in step S903, the target function setting unit 805 sets the target function $J(\{w_i\})$ represented by the following formula (23) including the target function $J(\{w_i\})$ represented by the formula (19) and two added constraint conditions relating to the coefficient $\{w_i\}$.

$$J(\{w_i\}) = -\sum_{n=1}^{N} \log\left\{f_\sigma\left(\sum_{i=1}^{N} w_i \phi_i(x_n)\right)\right\} - \qquad (23)$$

$$\sum_{m=1}^{M} \log\left\{1 - f_\sigma\left(\sum_{i=1}^{N} w_i \phi_i(x'_m)\right)\right\} \text{ s.t. } w_j \geq 0,$$

$$\sum_{i=1}^{N} w_i = C$$

In the present exemplary embodiment, the basis function $\varphi_i(x)$ in the formula (23) is represented by the formula (22). Thus, in the present exemplary embodiment, the generally used target function based on the logistic regression method with a restricted basis function and added constraint conditions is used as a target function for learning the coefficient $\{w_i\}$ of the pattern classifier. The first term of the right-hand side of the formula (23) has an effect of relatively lowering the specific category likelihood of specific category patterns relatively deviating from specific category patterns with respect to the specific category likelihood of specific category patterns not relatively deviating from specific category patterns. The second term of the right-hand side of the formula (23) has an effect of relatively lowering the specific category likelihood for non-specific category patterns used for learning with respect to the specific category likelihood of specific category patterns.

In the present exemplary embodiment, for example, the first term of the formula (23) is an example of a specific category learning term, and the second term of the formula (23) is an example of a non-specific category learning term. For example, the first term of the formula (23) makes it possible to shift, relatively toward the specific category unlikelihood, the value representing the specific category likelihood for specific category data for learning relatively deviating from the distribution of specific category data for learning. Further, for example, the second term of the formula (23) makes it possible to shift, relatively toward the specific category unlikelihood, the value representing the specific category likelihood for non-specific category data for learning.

In step S904, similar to the third exemplary embodiment, the parameter correction unit 806 repetitively performs the correction of the coefficient $\{w_i\}$ with the slope method and the constraint satisfaction on the coefficient $\{w_i\}$ until the learning of the classifier is determined to have converged in step S905. This enables obtaining an optimum solution (coefficient $\{w_i\}$). Although, in the third exemplary embodiment, the target function is maximized, the target function is minimized in the present exemplary embodiment. Thus, the coefficient $\{w_i\}$ recorded as the classifier parameter 804 is corrected.

As described above, when the coefficient $\{w_i\}$ which minimizes the value of the target function $J(\{w_i\})$ represented by the formula (23) is derived, the processing proceeds to step S906. In step S906, the classifier data output unit 807 outputs, to the outside, the classifier data obtained from the learning result. Similar to the first and the third exemplary embodiments, the classifier data output unit 807 outputs as the classifier data a list of sets of the optimized coefficient $\{w_i\}$ with $w_i>0$ and the specific category pattern $x_i$ corresponding to the coefficient $\{w_i\}$. For example, assume that there are Ns coefficients $\{w_i\}$ which are greater than 0 (zero). In this case, the classifier data output 807 outputs $N_S$ coefficients $\{w_{(S)i}\}$ (i=1, 2, $N_S$) and $N_S$ specific category patterns $\{x_{(S)i}\}$ (i=1, 2, . . . , $N_S$) respectively corresponding to the coefficients $\{w_{(S)i}\}$.

The above-described method enables training the pattern classifier for identifying whether an input face image is the face image of a specific person. It is highly possible that the pattern classifier trained by the above-described method is able to correctly determine that, if the input face image is largely different from the face image of the specific person, the input face image is not the face image of the specific person. This method further enables increasing the possibility that the pattern classifier is able to correctly determine that the face image of a person other than a specific person used for the learning of the pattern classifier is not the face image of the specific person. In particular, the method enables increasing the possibility that, if there is a person similar to a specific person used for learning in persons other than the specific person, the pattern classifier is able to correctly determine that the face image of that person is not the face image of the specific person.

In this way, not only in the case of a 1-class classifier but also in the case of a 2-class classifier, it is possible to configure a classifier capable of classifying both a pattern deviating from specific category patterns and a pattern similar to known non-specific category patterns used for the learning of the classifier. The above-described method is also applicable not only to the learning of a pattern classifier for detecting moving image abnormalities as is in the first and the third exemplary embodiments but also to a case for general patterns relating to determining whether the input face image is the face image of a specific person.

There are some hyper parameters also in the classifier learning method according to the present exemplary embodiment. More specifically, the parameter σ of the basis function $\varphi_i$ (x) represented by the formula (22) and the regularization parameter C which defines constraint conditions relating to the coefficient $\{w_i\}$ are hyper parameters. Also for these hyper parameters σ and C, suitable values can be set by performing a similar cross-validation method to that according to the second exemplary embodiment. However, if a large number of face images of other than a specific person are available, the hyper parameters σ and C can be suitably set by performing the general cross-validation method.

An example of a pattern classification method for determining, by using a classifier trained as described above, whether the face image input to the classifier is the face image of a specific person.

Figure 10:
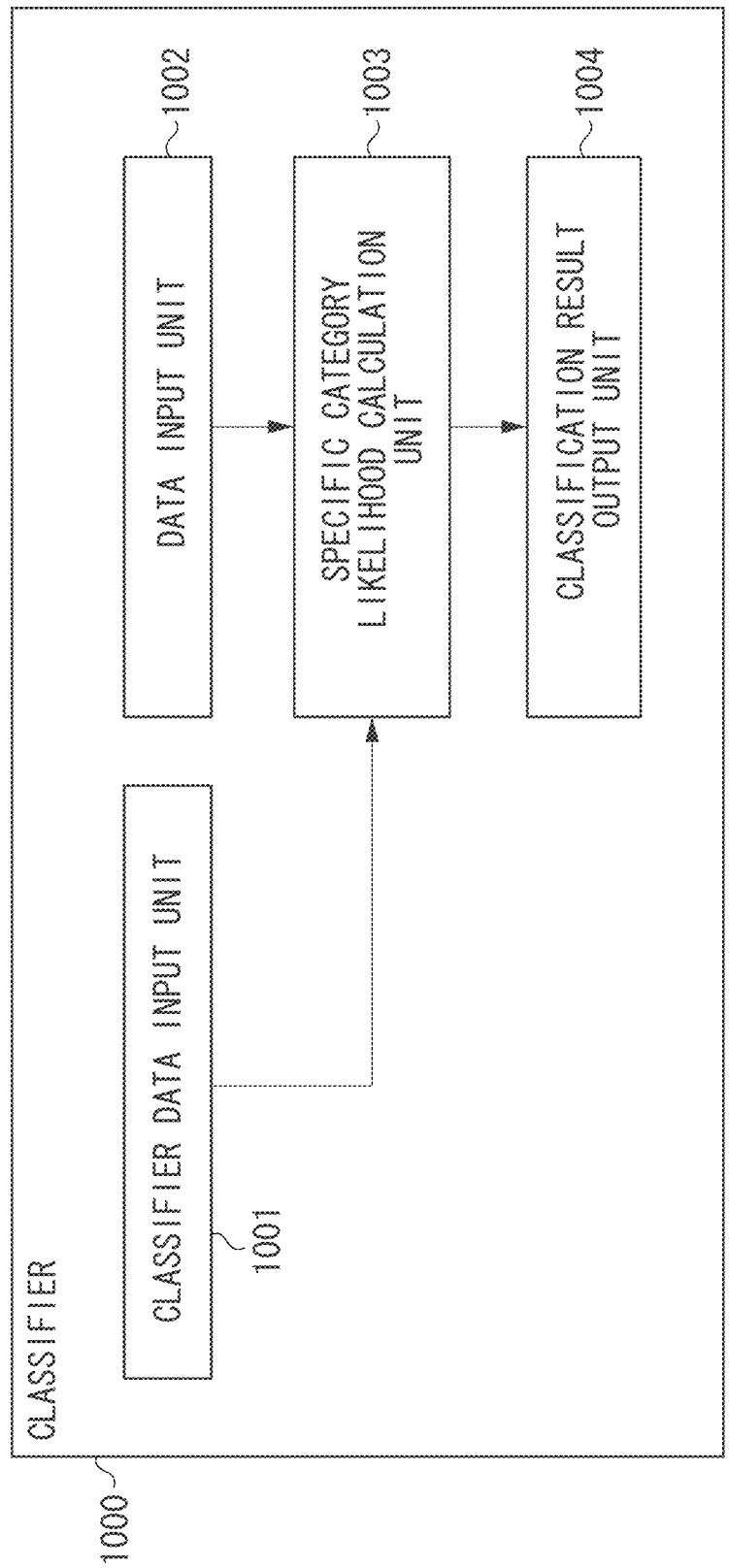
FIG. 10 is a block diagram illustrating a second example of a configuration of the classifier.
Figure 11:
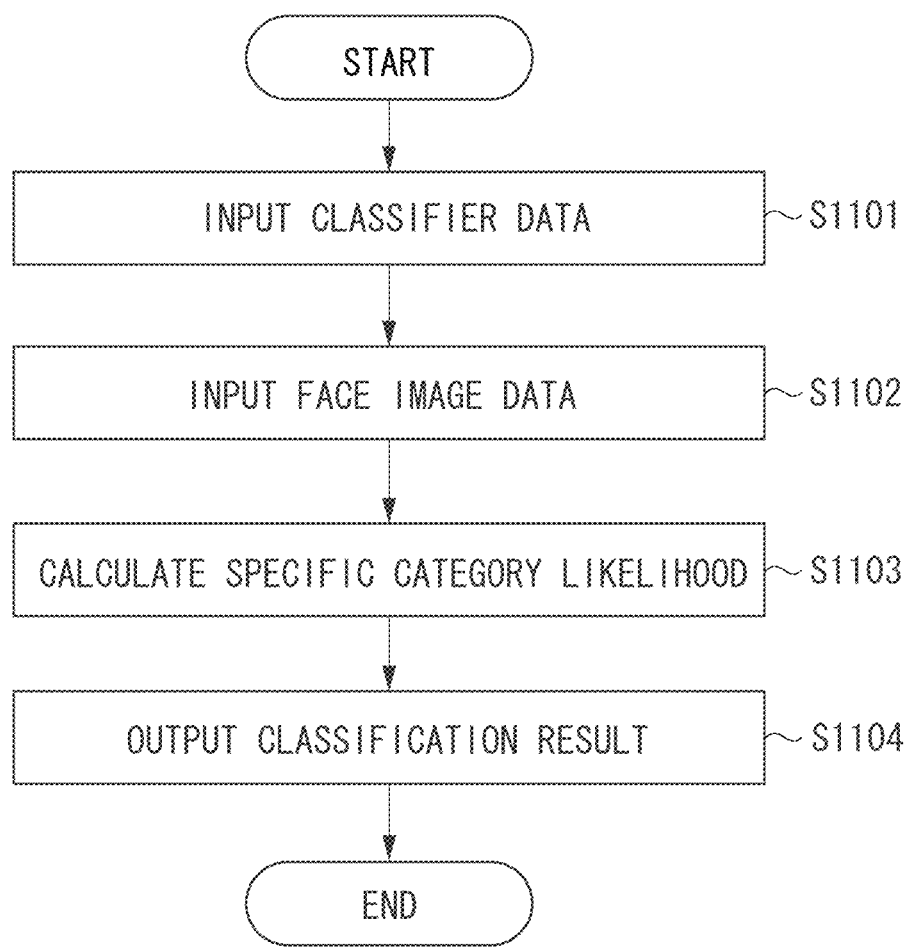
FIG. 11 is a flowchart illustrating a second example of processing performed by the classifier.

FIG. 10 illustrates an example of a functional configuration of a classifier 1000. FIG. 11 is a flowchart illustrating an example of processing performed by the classifier 1000. An example of a pattern classification method according to the present exemplary embodiment will be described below with reference to FIGS. 10 and 11.

In step S1101, a classifier data input unit 1001 inputs the classifier data output in step S906 illustrated in FIG. 9. More specifically, the classifier data input unit 1001 inputs $N_S$ coefficients $\{w_{(S)i}\}$ (i=1, 2, $N_S$) and $N_S$ specific category patterns $\{x_{(S)i}\}$ (i=1, 2, $N_S$) respectively corresponding to the coefficients $\{w_{(S)i}\}$. Similar to the description of step S401 illustrated in FIG. 4, the input form of the classifier data is not limited to particular forms. Since the $N_S$ coefficients $\{w_{(S)i}\}$ and the $N_S$ specific category patterns $\{x_{(S)i}\}$ are used by a specific category likelihood calculation unit 1003 (described below), these pieces of data are transmitted to the specific category likelihood calculation unit 1003.

In step S1102, the data input unit 1002 inputs face image data which is to be determined as the face image of a specific person. Data of various formats, such as image data captured by an imaging apparatus (not illustrated) and image files transmitted via a network, can be used as the face image data input in step S1102. However, these pieces of data need to be face image data having the same format as the learning data. In the above-described example, the data needs to be of a person's face region (20×20-pixel gray scale image) clipped from an image. The input face image data is handled as a 400-dimensional vector in which pixel values of 20×20 pixels are arranged in a raster scan manner.

In step S1103, the specific category likelihood calculation unit 1003 calculates the specific category likelihood based on the following formula (24) using the classifier data input in step S1101 and the face image data input in step S1102.

$$f_\sigma\left(\sum_{i=1}^{N_S} w_{(S)i} \exp\frac{-|x_{(S)i} - x|^2}{2\sigma^2}\right) \quad (24)$$

x denotes the face image data (400-dimensional vector) input in step S1102. In the present exemplary embodiment, the specific category likelihood represents the likelihood that input data is the face image of a specific person.

In step S1104, an classification result output unit 1004 compares the specific category likelihood calculated in step S1103 with the threshold value. When the specific category likelihood is equal to or greater than a threshold value 0.5, the classification result output unit 1004 determines that the input face image is the face image of a specific person. On the other hand, when the specific category likelihood is smaller than the threshold value 0.5, the classification result output unit 1004 determines that the input face image is not the face image of the specific person. The classification result output unit 1004 outputs the result of the determination to the outside. In the present exemplary embodiment, the classification result output unit 1004 determines whether the input face image is the face image of a specific person depending on whether the specific category likelihood is equal to or greater than the threshold value 0.5. However, the threshold value is not limited to 0.5. For example, to reduce the possibility that the classification result output unit 1004 erroneously determines that the face image of other than a specific person is the face image of the specific person, it is necessary to increase the threshold value within a range smaller than 1. This completes processing of the pattern classification method according to the present exemplary embodiment. Similar to the description of step S405 illustrated in FIG. 4, the output form of the result of the determination is not limited to particular forms.

The above-described processing enables determining whether the face image input to the classifier is the face image of a specific person. This processing increases the possibility that the classification result output unit 1004 correctly determines that not only a face image largely different from the face image of a specific person but also a face image similar to the face image of other than a specific person used for the learning of the pattern classifier is not the face image of the specific person.

Next, a fifth exemplary embodiment will be described. In the present exemplary embodiment, an example of a parameter learning method of the pattern classifier used in the method for detecting as an abnormal pattern a defective portion on the surface of a product having complicated texture patterns based on a captured image of the surface, will be described. In the present exemplary embodiment, an example case is described in which the product having complicated texture patterns is a rubber plate having undergone surface roughening treatment. However, the method according to the present exemplary embodiment is also applicable to other products. In the first to the fourth exemplary embodiments, a pattern classifier having a format represented by a linear coupling of predetermined basis functions is used. On the other hand, in the present exemplary embodiment, a pattern classifier having a different format is used. In the first to the fourth exemplary embodiments, an example case has been described in which the specific category likelihood for non-specific category data used for learning is lowered (refer to the formula (4) and the second term of the right-hand side of the formula (6)). On the other hand, in the present exemplary embodiment, a target function used to learn the parameters of the pattern classifier is set to increase the non-specific category likelihood for non-specific category data used for learning. In this way, the present exemplary embodiment differs from the first to the fourth exemplary embodiments mainly in the configuration and processing due to a different classifier and a different target function used to learn the parameters of the classifier. Therefore, in the description of the present exemplary embodiment, units and steps identical to those in the first to the fourth exemplary embodiments are assigned the same reference numerals as those in FIGS. 1 to 11, and detailed descriptions thereof will be omitted.

Figure 12:
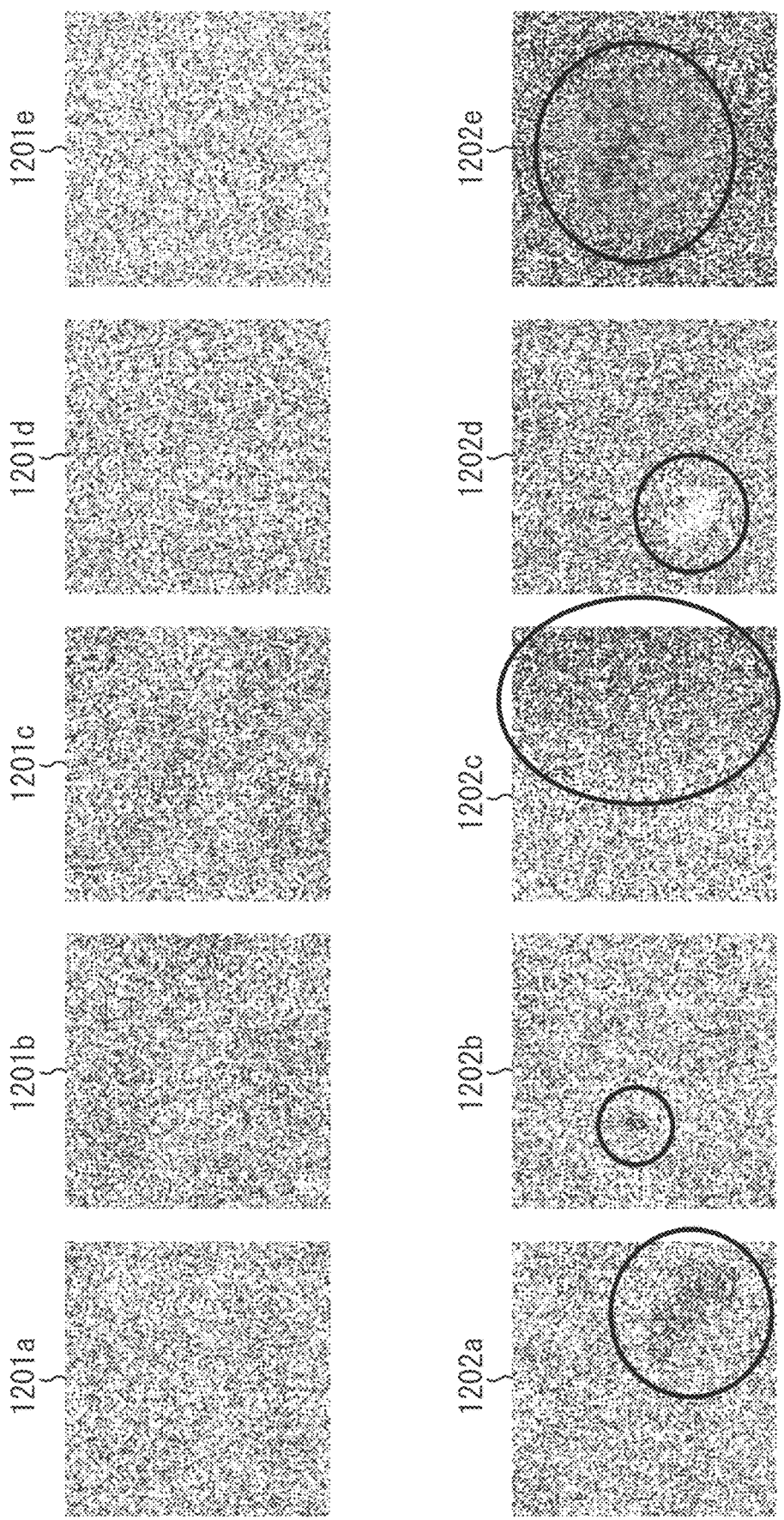
FIG. 12 illustrates processing target patterns.

FIG. 12 illustrates examples of processing target patterns according to the present exemplary embodiment. These patterns are 128×128-pixel regions clipped from a captured gray scale image of the surface of a rubber plate having undergone surface roughening treatment. Referring to FIG. 12, image data 1201a to 1201e are images clipped from an image of a normal rubber plate, and image data 1202a to 1202e are images of regions containing a defective portion (indicated by circles) clipped from an image of a rubber plate having defective portions.

In the present exemplary embodiment, image data such as the image data 1201a to 1201e are referred to as normal data, and image data such as the image data 1202a to 1202e are referred to as abnormal data. The image data 1202a to 1202e are abnormal data containing a defective portion such as a black spot-shaped unevenness. As illustrated in FIG. 12, defective portions are different in shape and size.

Like the image data 1202c, some defective patterns have an overall gradation. Like the image data 1202d, some defective patterns have a white spot-shaped unevenness. Like the image data 1202e, some defective patterns have partially low texture contrast. There are various types of defective portions in this way. In the present exemplary embodiment, a pattern classifier is trained so as to be able to determine image data such as the image data 1201a to 1201e as normal data and determine image data such as the image data 1202a to 1202e as abnormal data.

Figure 13:
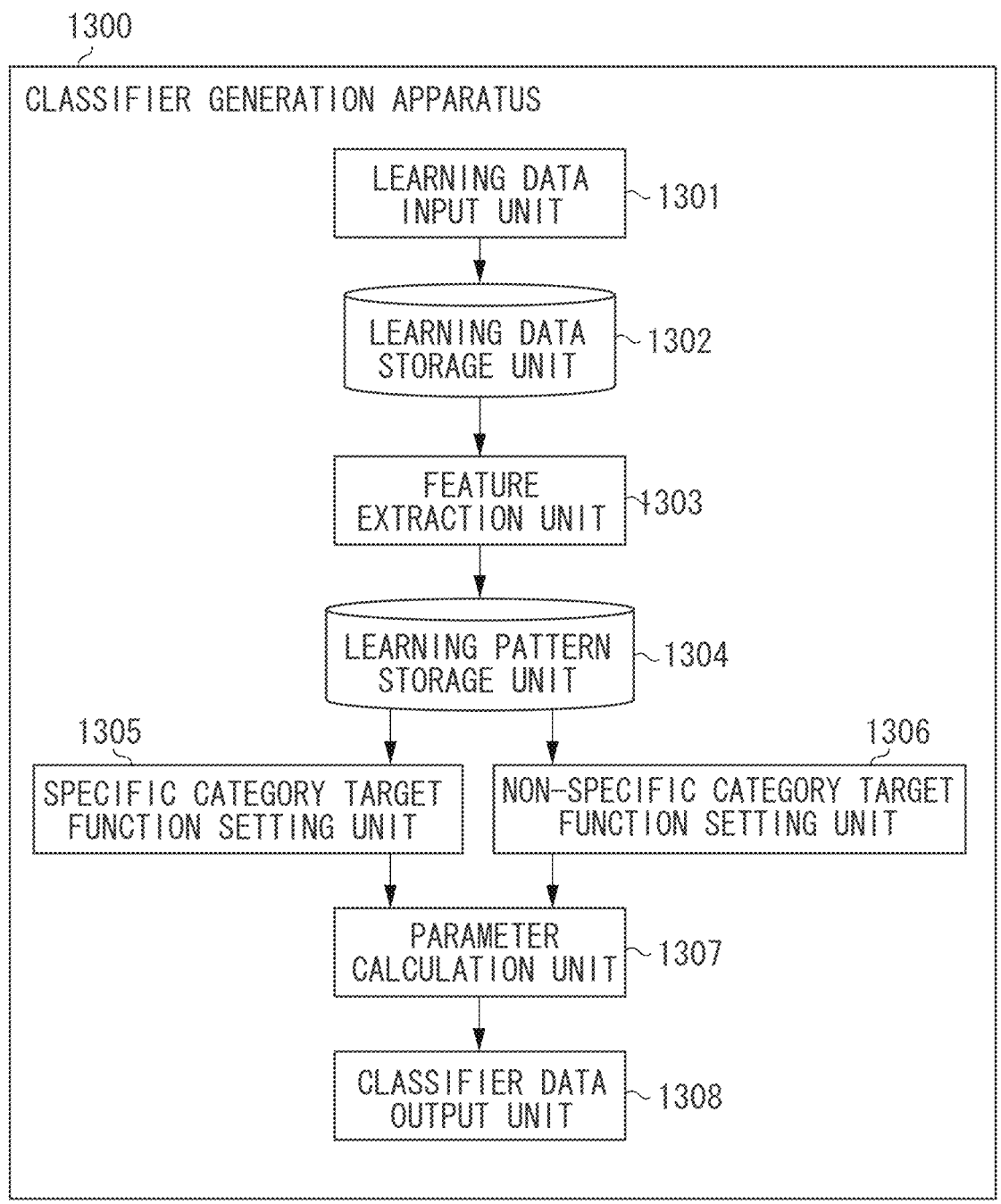
FIG. 13 is a block diagram illustrating a third example of a configuration of the classifier generation apparatus.
Figure 14:
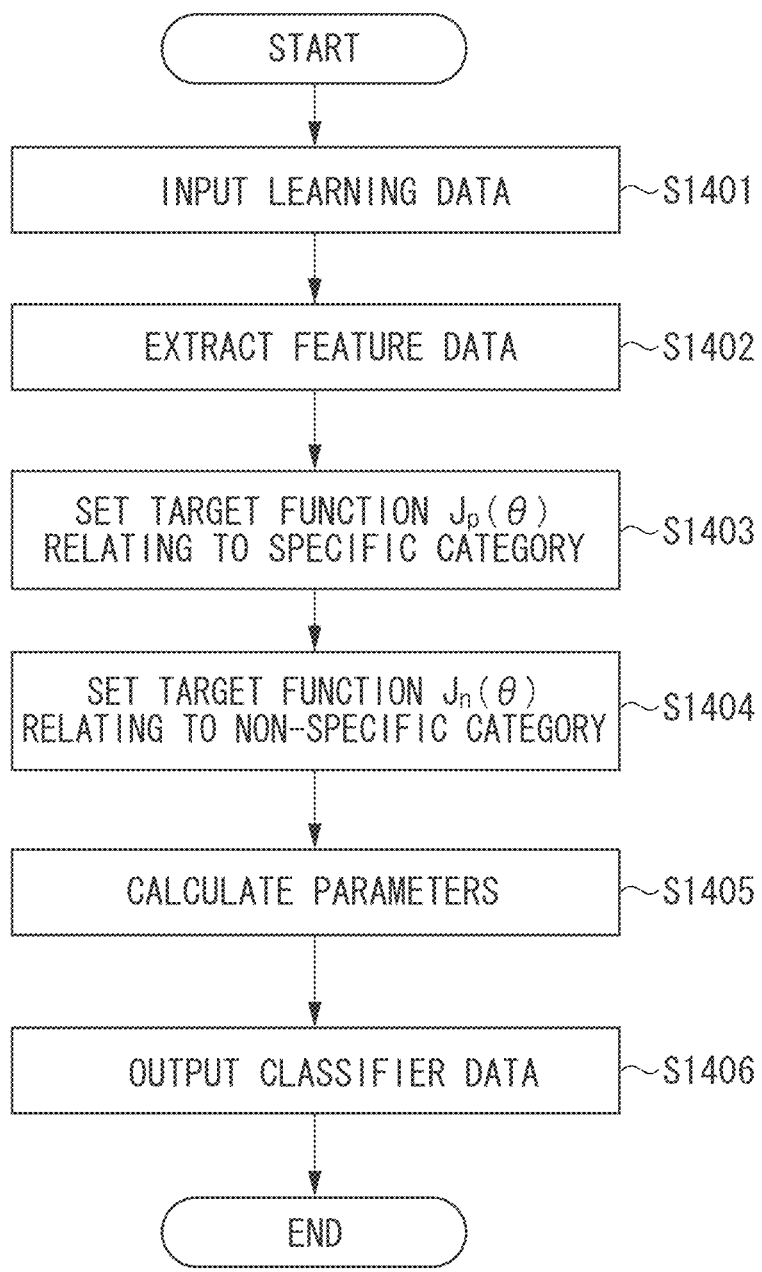
FIG. 14 is a flowchart illustrating a third example of processing performed by the classifier generation apparatus.

FIG. 13 illustrates an example of a functional configuration of a classifier generation apparatus 1300. FIG. 14 is a flowchart illustrating an example of processing performed by the classifier generation apparatus 1300. An example of a classifier learning method according to the present exemplary embodiment will be described with reference to FIGS. 13 and 14, centering on units and steps different from the first to the fourth exemplary embodiments.

In step S1401, the learning data input unit 1301 inputs a large number of learning data. The learning data is used for the learning of the classifier. In the present exemplary embodiment, a large number of image data 1201*a* to 1201*e* and 1202*a* to 1202*e* as illustrated in FIG. 12 are used as a large number of learning data. More specifically, the learning data input unit 1301 inputs N pieces of non-defective image data such as the image data 1201*a* to 1201*e* and M pieces of defective image data such as the image data 1202*a* to 1202*e*. The larger amount of non-defective image data are more desirable. On the other hand, there may be at least one piece of defective image data. The learning data input unit 1301 records the input image data in the learning data storage unit 1302. In the present exemplary embodiment, for example, non-defective image data is an example of specific category data for learning, and defective image data is an example of non-specific category data for learning.

In step S1402, the feature extraction unit 1303 extracts feature data (feature amount) from respective learning data recorded in the learning data storage unit 1302 in step S1301. In the present exemplary embodiment, for each piece of image data, the feature extraction unit 1303 extracts d different (e.g., about 30 different) feature amounts such as the average value, dispersion, and maximum value of pixel values. The feature extraction unit 1303 arranges the d different feature amounts extracted from each piece of image data, associates them with the extraction source image data, and records them in the learning pattern storage unit 1304 as a d-dimensional feature vector. In the following description, the d-dimensional feature vectors extracted from non-defective normal image data and recorded in the learning pattern storage unit 1304 is described as normal patterns as needed. Further, the d-dimensional feature vectors extracted from defective abnormal data and recorded in the learning pattern storage unit 1304 is described as abnormal patterns as needed. In the present exemplary embodiment, N d-dimensional feature vectors are recorded in the learning pattern storage unit 1304 as normal patterns, and M d-dimensional feature vectors are recorded therein as abnormal patterns.

Then, the learning of the pattern classifier is performed by using a plurality of normal patterns and at least one abnormal pattern recorded in the learning pattern storage unit 1304. Now, the pattern classifier to be trained in the present exemplary embodiment is described. The pattern classifier to be trained in the present exemplary embodiment determines input data x (d-dimensional feature vector) as specific category data, i.e., a normal pattern when the value of f(x) represented by the following formula (25) is smaller than a predetermined threshold value. On the other hand, the pattern classifier determines the input data x (d-dimensional feature vector) as not specific category data, i.e., an abnormal pattern when the value of f(x) represented by the following formula (25) is equal to or greater than the predetermined threshold value.

$$f(x) = (x-\mu)^T \Sigma^{-1}(x-\mu) \tag{25}$$

$\mu$ and $\Sigma$ are parameters respectively determined through the learning. More specifically, the parameter $\mu$ is a d-dimensional feature vector and the parameter $\Sigma$ is a (d×d) matrix. The larger the value of the function f(x) represented by the formula (25), the more likely the input data is to be determined as not specific category data. Therefore, it can be said that the function f(x) in the formula (25) represents the non-specific category likelihood. Although, in the first to the fourth exemplary embodiments, the learning is performed based on the specific category likelihood, the non-specific category likelihood is the reverse of the specific category likelihood. Therefore, the learning can also be performed based on the function f(x) represented by the formula (25), i.e., the non-specific category likelihood in a similar way to the case where the learning is performed based on the specific category likelihood.

In step S1403, a specific category target function setting unit 1305 sets a target function $J_p(\theta)$ relating to specific category data, i.e., normal patterns. $\theta$ means a parameter to be determined by the learning. In the present exemplary embodiment, since the parameters $\mu$ and $\Sigma$ are to be determined, the specific category target function setting unit 1305 sets the target function $J_p(\mu, \Sigma)$ represented by the following formula (26).

$$J_p(\mu, \Sigma) = \sum_{n=1}^{N} (x_n - \mu)^T \Sigma^{-1} (x_n - \mu) + N \log|\Sigma| \tag{26}$$

$x_n$ denotes the n-th normal pattern, and $|\Sigma|$ denotes the determinant of $\Sigma$. The first term of the target function $J_p(\mu, \Sigma)$ is the sum total of the function f(x) (i.e., the non-specific category likelihood) represented by the formula (25) for normal patterns used for learning. Therefore, the average non-specific category likelihood for normal patterns can be lowered by decreasing the value of the first term of the target function $J_p(\mu, \Sigma)$. The deviance of the n-th normal pattern $x_n$ from the normal pattern distribution is represented by (xn–$\mu$)$\Sigma^{-1}$(xn–$\mu$). The second term of the target function $J_p(\mu, \Sigma)$ is a regularization term relating to the parameter $\Sigma$.

In step S1404, the non-specific category target function setting unit 1306 sets the target function $J_n(\mu, \Sigma)$ relating to non-specific category data, i.e., abnormal patterns. In the present exemplary embodiment, since such a target function that increases the non-specific category likelihood for an abnormal pattern is set, the target function $J_n(\mu, \Sigma)$ represented by the following formula (27) is set.

$$J_n(\mu, \Sigma) = -\sum_{m=1}^{M} (x'_m - \mu)^T \Sigma^{-1} (x'_m - \mu) \tag{27}$$

$x'_m$ is the m-th abnormal pattern. The target function $J_n(\mu, \Sigma)$ inverts the sign of the sum total of the non-specific category likelihood f(x) for abnormal patterns used for learning. Therefore, the average non-specific category likelihood for abnormal patterns can be increased by decreasing the value of the target function $J_n(\mu, \Sigma)$.

In step S1405, a parameter calculation unit 1307 calculates the parameters $\mu$ and $\Sigma$ which minimize the target function $J(\mu, \Sigma)$ represented by the following formula (28) that integrates the target function $J_p(\mu, \Sigma)$ represented by the formula (26) and the target function $J_n(\mu, \Sigma)$ represented by the formula (27). In the present exemplary embodiment, for example, the first term of the formula (28) is an example of a specific category learning term, and the third term of the formula (28) is an example of a non-specific category learning term. For example, the first term of the formula (28) makes it possible to shift relatively toward the specific category unlikelihood the value representing the specific category likelihood for specific category data for learning relatively deviating from the distribution of specific category data for learning. Further, for example, the third term of the formula (28) makes it possible to shift relatively toward the specific category unlikelihood the value representing the specific category likelihood for non-specific category data for learning.

$$J(\mu, \Sigma) = \sum_{n=1}^{N}(x_n - \mu)^T \Sigma^{-1}(x_n - \mu) + \qquad (28)$$

$$N \log\left|\Sigma\right| - \lambda \sum_{m=1}^{M}(x'_m - \mu)^T \Sigma^{-1}(x'_m - \mu)$$

In this case, $\lambda$ is a positive parameter for adjusting the balance between effects of the target functions $J_p(\mu, \Sigma)$ and $J_n(\mu, \Sigma)$. The parameter $\lambda$ has the same meaning as the parameter $\lambda$ according to the first and the third exemplary embodiments. However, in the present exemplary embodiment, it is preferable that the parameter calculation unit 1307 sets the parameter $\lambda$ so that a condition $\lambda < N/M$ is satisfied. Unlike the first to the fourth exemplary embodiments, the parameters $\mu$ and $\Sigma$ which minimize the value of the target function $J(\mu, \Sigma)$ represented by the formula (28) are analytically obtained. The parameters $\mu$ and $\Sigma$ which minimize the value of the target function $J(\mu, \Sigma)$ are calculated by the following formulas (29) and (30), respectively.

$$\mu = \frac{1}{N - \lambda M}\left\{\sum_{n=1}^{N} x_n - \lambda \sum_{m=1}^{M} x'_m\right\} \qquad (29)$$

$$\Sigma = \frac{1}{N - \lambda M}\left\{\sum_{n=1}^{N}(x_n - \mu)(x_n - \mu)^T - \lambda \sum_{m=1}^{M}(x'_m - \mu)(x'_m - \mu)^T\right\} \qquad (30)$$

The parameter calculation unit 1307 transmits the thus-calculated parameters $\mu$ and $\Sigma$ to a classifier data output unit 1308.

In step S1406, the classifier data output unit 1308 outputs the parameters $\mu$ and $\Sigma$ calculated in step S1405 to the outside as the classifier data.

The above-described processing enables training the pattern classifier having a high possibility of correctly determining as abnormal patterns not only patterns deviating from normal patterns but also patterns similar to abnormal patterns used for learning. Although, in the present exemplary embodiment, the hyper parameters include only the parameter $\lambda$, suitable values can be selected by using the cross-validation method according to the second exemplary embodiment. However, if a large number of pieces of defective image data is available, a suitable hyper parameter $\lambda$ can be set through the general cross-validation method.

When detecting as abnormal patterns a defective portion on the surface of a product having complicated texture patterns based on a captured image of the surface by using a pattern classifier trained through the above-described method, the classifier first inputs the parameters $\mu$ and $\Sigma$ as the classifier data. Then, the classifier inputs inspection target image data, extracts d different feature amounts from the image data as described above, and generates a d-dimensional feature vector as an arrangement of these feature amounts. Then, based on the input parameters $\mu$ and $\Sigma$, the classifier calculates the non-specific category likelihood for the d-dimensional feature vector by performing the calculation represented by the formula (25). When the value of the non-specific category likelihood is equal to or smaller than a predetermined threshold value, the classifier determines the input image data as a normal pattern. On the other hand, when the value is greater than the predetermined threshold value, the classifier determines the input image data as a defective abnormal pattern.

As described above, the classifier may be a pattern classifier used for surface defect inspection of a product. Although, in the first to the fourth exemplary embodiments, a pattern classifier having a format of linear coupling of predetermined basis functions is used, a different pattern classifier may be used as in the present exemplary embodiment. Although, in the first to the fourth exemplary embodiments, the learning is based on the specific category likelihood, the present invention is also applicable to a method based on the non-specific category likelihood which is the reverse of the specific category likelihood, as with the present exemplary embodiment.

Next, a sixth exemplary embodiment will be described. In the present exemplary embodiment, there is described an example of a pattern classifier learning method used in a method for determining whether an apparatus such as a manufacturing apparatus is abnormal based on information detected by a plurality of sensors installed in the apparatus. Although a case of a manufacturing apparatus will be described below as an example according to the present exemplary embodiment, the present exemplary embodiment is also applicable, for example, to vehicles and printing apparatuses. The present exemplary embodiment uses a 1-class pattern classifier employing the extended k-neighborhood method. In this way, the present exemplary embodiment differs from the first to the fifth exemplary embodiments mainly in the configuration and processing due to a difference in classifier. Therefore, in the description of the present exemplary embodiment, units and steps identical to those in the first to the fifth exemplary embodiments are assigned the same reference numerals as those in FIGS. 1 to 14, and detailed descriptions thereof will be omitted.

Figure 15:
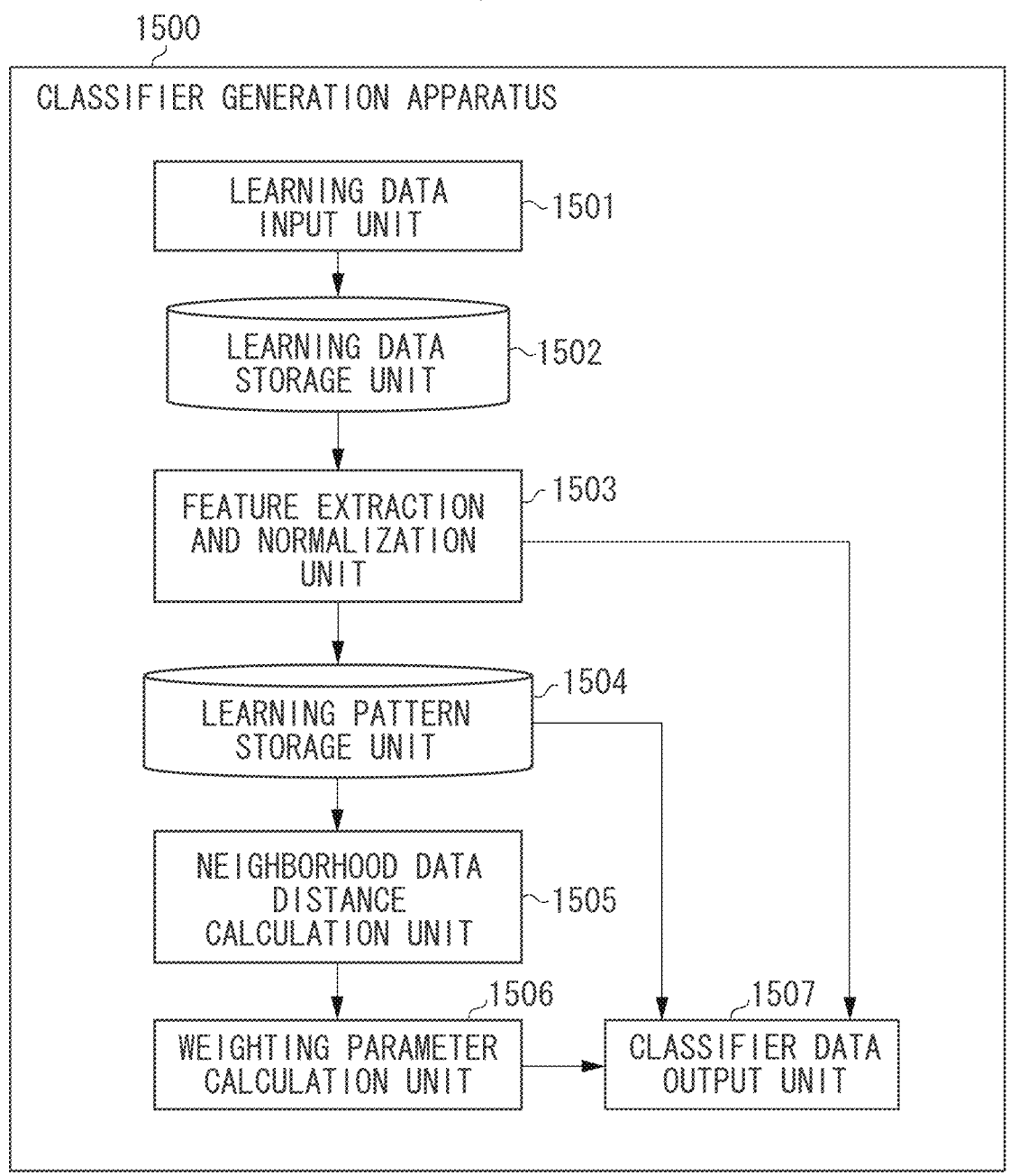
FIG. 15 is a block diagram illustrating a fourth example of a configuration of the classifier generation apparatus.
Figure 16:
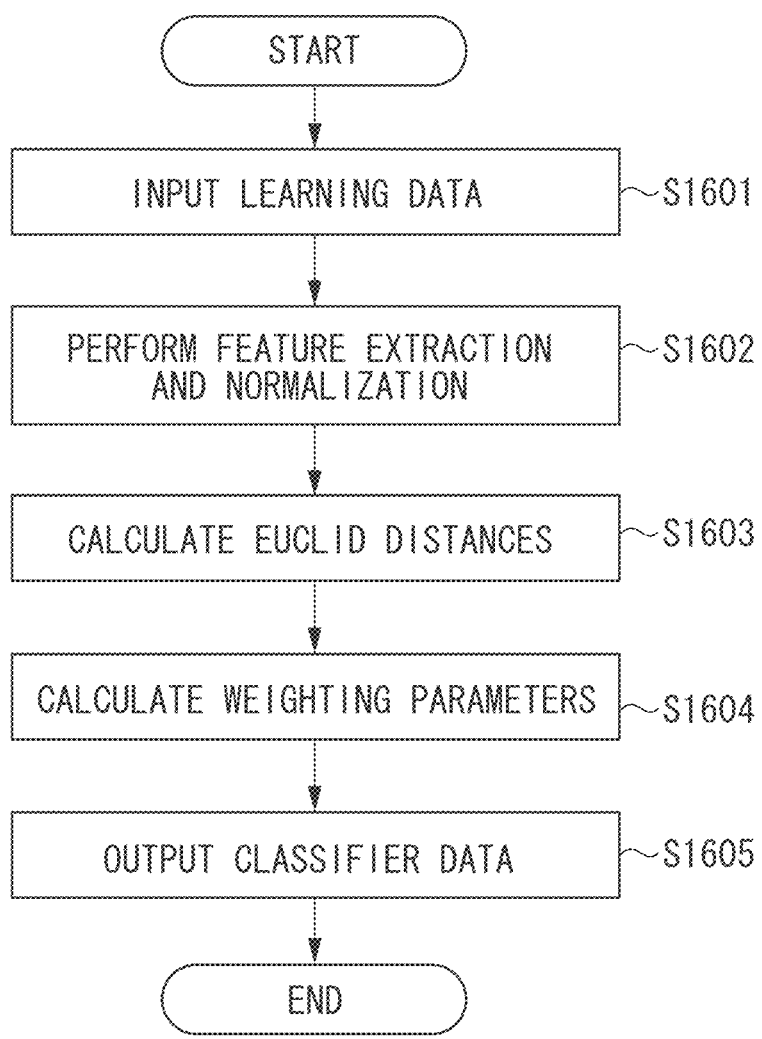
FIG. 16 is a flowchart illustrating a fourth example of processing performed by the classifier generation apparatus.

FIG. 15 illustrates an example of a functional configuration of a classifier generation apparatus 1500. FIG. 16 is a flowchart illustrating an example of processing performed by the classifier generation apparatus 1300. An example of a classifier learning method according to the present exemplary embodiment will be described with reference to FIGS. 15 and 16, centering on units and steps different from those in the first to the fifth exemplary embodiments.

In step S1601, the learning data input unit 1501 inputs a large number of learning data. The learning data is used for the learning of the classifier. As a large number of learning data, the present exemplary embodiment uses a set of information detected under various operating conditions by a plurality of sensors installed in the manufacturing apparatus. In the following descriptions of the present exemplary embodiment, information detected by the sensors is referred to as sensor information as needed. More specifically, the learning data input unit 1501 inputs N sets of sensor information acquired under the normal operating condition and M sets of sensor information acquired under certain abnormal conditions. It is more desirable that there is a larger number of sensor information acquired under the normal operating condition. On the other hand, there may be at least one piece of sensor information acquired under certain abnormal conditions. The learning data input unit 1501 inputs data as a set of information from a plurality of sensors, such as temperatures at a plurality of portions in the manufacturing apparatus, current amounts at a plurality of wiring portions in the manufacturing apparatus, and stress changes within a predetermined time period at a plurality of movable portions in the manufacturing apparatus. The learning data input unit 1501 records the input data in the learning data storage unit 1502. In the present exemplary embodiment, for example, sensor information acquired under the normal operating condition is an example of specific category data for learning, and sensor information acquired under certain abnormal conditions is an example of non-specific category data for learning.

In step S1602, a feature extraction and normalization unit 1503 performs the feature data extraction and the feature data normalization on each of learning data input in step S1601. In the present exemplary embodiment, based on various types of sensor information, the feature extraction and normalization unit 1503 generates a d-dimensional (e.g., about 30-dimensional) feature vector and performs normalization processing for each element of this feature vector. As each element of the d-dimensional feature vector, sensor information including temperature sensor values may be used as it is. For example, as for time-sequential data such as stress changes within a predetermined time period, the intensities of predetermined frequency components may be extracted through spectral analysis and used as elements of the feature vector. As a matter of course, the elements of the feature vector are not limited to the intensities of frequency components. For example, differences between the maximum and minimum values of time-sequential data may be used as the elements of the feature vector.

Then, the feature extraction and normalization unit 1503 obtains the standard deviation of each element of the feature vector generated from the N sets of information acquired under the normal operating condition, and divides each element of all of the generated feature vectors by the standard deviation of the element to perform normalization. The feature extraction and normalization unit 1503 performs the above-described feature vector generation and feature vector normalization on all of the data recorded in the learning data storage unit 1502. Then, the feature extraction and normalization unit 1503 associates the resultant data with the feature vector generation source data and records the feature vectors in the learning pattern storage unit 1504.

The feature extraction and normalization unit 1503 also performs the above-described feature vector generation and feature vector normalization on the M sets of sensor information acquired under certain abnormal conditions. Then, the feature extraction and normalization unit 1503 associates the resultant data with the feature vector generation source data and records them in the learning pattern storage unit 1504.

In the following description of the present exemplary embodiment, the d-dimensional feature vectors generated and normalized based on the sensor information acquired under the normal operating condition are referred to as normal patterns as needed. Further, the d-dimensional feature vectors generated and normalized based on the sensor information acquired under certain abnormal conditions are referred to as abnormal patterns as needed. In the present exemplary embodiment, the N d-dimensional feature vectors are recorded in the learning pattern storage unit 1504 as normal patterns and the M d-dimensional feature vectors are recorded therein as abnormal patterns.

Now, the pattern classifier to be trained in the present exemplary embodiment will be described. The present exemplary embodiment uses a 1-class pattern classifier employing the extended k-neighborhood method. More specifically, the classifier calculates the value of f(x) represented by the following formula (30) by using the weighting parameters $\{w_i\}$ (i=1, 2, ..., N) respectively corresponding to the N normal patterns for the input d-dimensional feature vector x. The classifier determines whether the input d-dimensional feature vector x is specific category data based on the result of this calculation.

$$f(x) = \sum_{i^* \in Neighbor(x)} w_{i^*} |x_{i^*} - x| \qquad (31)$$

i* denotes the pattern number of up to k normal patterns (k denotes the number of hyper parameters, for example, k=3) each having a short Euclid distance from the input feature vector x, out of the N normal patterns. $x_{i^*}$ denotes the i*-th normal pattern and denotes the weighting parameter corresponding to the i*-th normal pattern. More specifically, the formula (30) weights the Euclid distances of the k normal patterns each having a short Euclid distance from the input feature vector x, out of the N normal patterns used for learning, by using the weighting parameters respectively corresponding to normal patterns, and totalizes the weighted distances.

The classifier considers the value of the formula (30) as the non-specific category likelihood. When this value is smaller than a predetermined threshold value, the classifier determines the input feature vector x as specific category data. On the other hand, when this value is equal to or greater than the predetermined threshold value, the classifier determines the input feature vector x as not specific category data. When all weighting parameters $w_{i^*}$ are 1, this learning method is equivalent to one of general methods for what is called a 1-class pattern classifier employing the k neighborhood method.

On the other hand, the learning method according to the present exemplary embodiment introduces the weighting parameter $\{w_i\}$ for a normal pattern. Then, using the input learning data, the learning method increases the sensitivity to abnormal patterns used for learning, by setting the weighting parameter $\{w_i\}$ in the processing in step S1603 and subsequent steps.

In step S1603, for each of the M abnormal patterns, a neighborhood data distance calculation unit 1505 obtains k normal patterns each having a shortest Euclid distance and k Euclid distances to the k normal patterns, out of the N normal patterns. This processing will be described in detail below using the m-th abnormal pattern as an example. The neighborhood data distance calculation unit 1505 calculates the Euclid distances between the m-th abnormal pattern and all of the N normal patterns (first to N-th patterns) and searches for k Euclid distances having smallest values out of all of the calculated Euclid distances. Then, for each of the searched k Euclid distances, the neighborhood data distance calculation unit 1505 obtains, for each distance of the searched out k Euclid distances, a set of the pattern number of the corresponding normal pattern and the Euclid distance between the normal pattern with that pattern number and the m-th abnormal pattern. The neighborhood data distance calculation unit 1505 performs this processing on all of the M abnormal patterns. As a result, this processing enables obtaining a total of M×k sets of the pattern number of the normal pattern and the Euclid distance corresponding to the pattern number.

In step S1604, based on the sets of the pattern number of the normal pattern and the corresponding Euclid distance obtained in step S1603, a weighting parameter calculation unit 1506 calculates the weighting parameters $\{w_i\}$ respectively corresponding to the N normal patterns. More specifically, the weighting parameter calculation unit 1506 calculates each weighting parameter $\{w_i\}$ based on the following formula (32).

$$w_i = 1 + \sum_{m^\wedge \in Neighbor \to x_i} \frac{\lambda}{|x_i - x'_{m^\wedge}|} \quad (32)$$

m^ denotes the pattern number of the abnormal pattern when the i-th normal pattern is any one of the k neighborhood normal patterns. m^ is obtained based on the result of the processing in step S1603. $x'_{m^\wedge}$ denotes the m^-th abnormal pattern. The parameter $\lambda$ has the same meaning as the parameter $\lambda$ according to the first, the third, and the fifth exemplary embodiments. More specifically, $\lambda$ denotes a positive parameter for adjusting the effect relating to abnormal patterns in the learning of the pattern classifier. As represented by the formula (31), when the i-th normal pattern is none of the k neighborhood normal patterns for all of the M abnormal patterns, the weighting parameter $\{w_i\}$ becomes the minimum value 1. When the i-th normal pattern is any one of the k neighborhood normal patterns for at least one of the M abnormal patterns, a weight in inverse proportion to the Euclid distance is added to the weighting parameter $w_i$. Increasing the weight of the weighting parameter for the normal pattern in the neighborhood of abnormal patterns in this way enables increasing the non-specific category likelihood represented by the formula (30) with respect to data in the neighborhood of normal patterns (in the neighborhood of abnormal patterns). As a result, since the non-specific category likelihood of abnormal patterns used for learning is increased, it becomes possible to train the pattern classifier having a high possibility of determining such data as not specific category data. The non-specific category likelihood represented by the formula (31) has a large value regardless of the value of the weighting parameter with respect to data deviating from the distribution of normal patterns. Therefore, the pattern classifier is able to correctly determine even such data as not specific category data.

In step S1605, a classifier data output unit 1507 outputs the classifier data obtained from the learning result to the outside. More specifically, the classifier data output unit 1507 outputs N weighting parameters $\{w_i\}$, N normal patterns $\{x_i\}$ respectively corresponding to the weighting parameters $\{w_i\}$, and the standard deviation of each element of the feature vector (d standard deviations) as the classifier data.

There are two hyper parameters k and $\lambda$ also in the case of the classifier learning method according to the present exemplary embodiment. These hyper parameters k and A can also be suitably set by performing a similar cross-validation method to that according to the second exemplary embodiment.

An example of a pattern classification method for determining, based on information from a plurality of sensors installed in a manufacturing apparatus, whether an abnormality has occurred in the manufacturing apparatus by using a classifier trained as described above.

Figure 17:
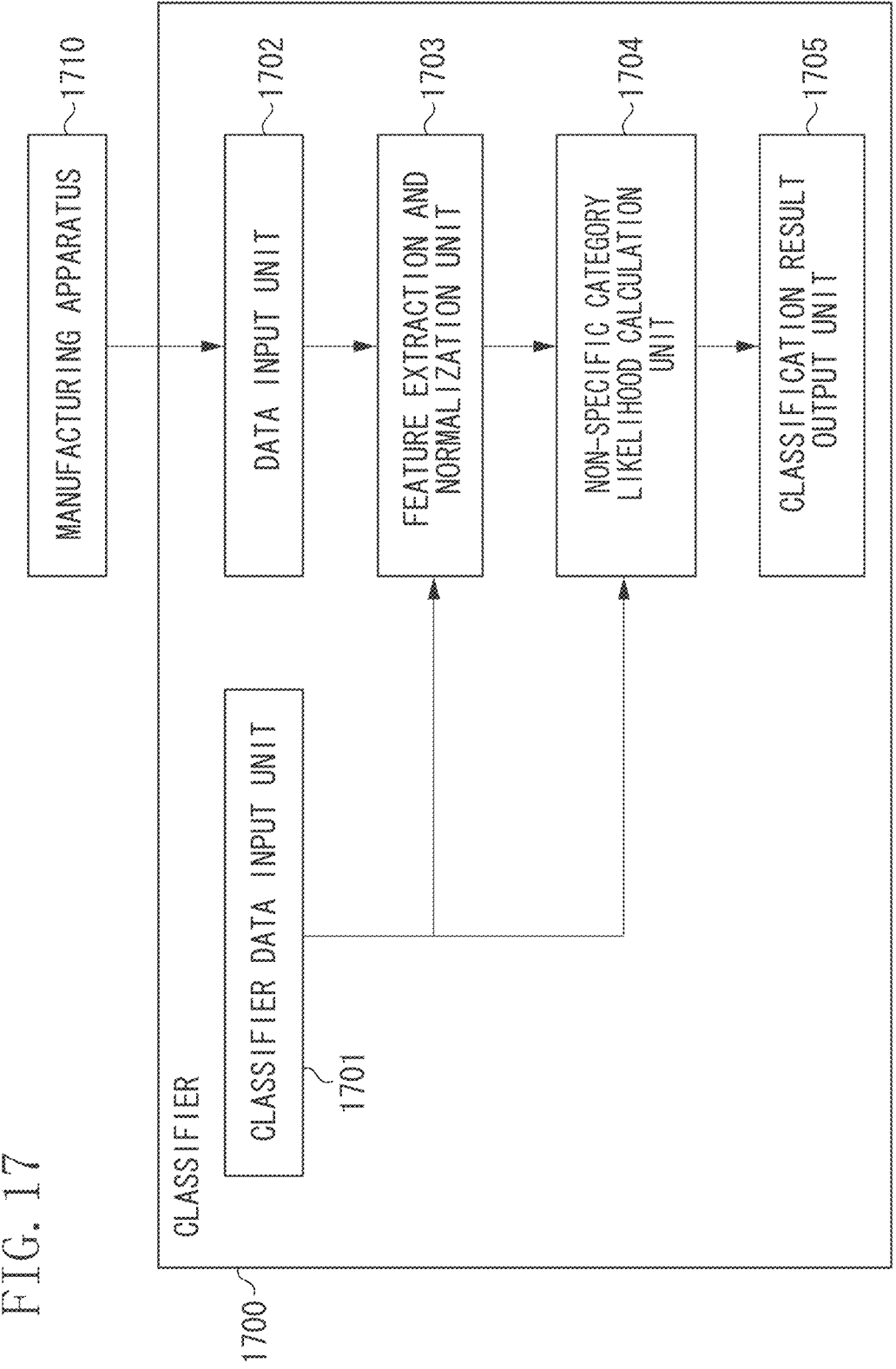
FIG. 17 is a block diagram illustrating a third example of a configuration of the classifier.

FIG. 17 illustrates an example of a functional configuration of a classifier 1700. FIG. 18 is a flowchart illustrating an example of processing performed by the classifier 1700. An example of a pattern classification method according to the present exemplary embodiment will be described below with reference to FIGS. 17 and 18.

In step S1801, the classifier 1700 inputs the classifier data output in step S1605 illustrated in FIG. 16. More specifically, the classifier 1700 inputs the N weighting parameters $\{w_i\}$ (i=1, 2, . . . , N), the N normal patterns $\{x_i\}$ (i=1, 2, . . . , N) respectively corresponding to the weighting parameters $\{w_i\}$, and the standard deviation of each element of the feature vector (d standard deviations). Similar to step S401 illustrated in FIG. 4, the input form of the classifier data is not limited to particular forms. The N weighting parameters $\{w_i\}$ and the N normal patterns $\{x_i\}$ will be used by a non-specific category likelihood calculation unit 1704 (described below). Therefore, the N weighting parameters $\{w_i\}$ and the N normal patterns $\{x_i\}$ are transmitted to the non-specific category likelihood calculation unit 1704. The d standard deviations will be used for the normalization of the feature vectors by the feature extraction and the normalization unit 1703 (described below). Therefore, the d standard deviations are transmitted to the feature extraction and the normalization unit 1703.

In step S1802, a data input unit 1702 inputs data as a set of information detected by a plurality of sensors (information from a plurality of sensors) installed in a manufacturing apparatus 1710 for determining whether an abnormality has occurred. More specifically, the data input unit 1702 inputs data as a set of information from a plurality of sensors, such as temperatures detected by a plurality of sensors installed in the manufacturing apparatus 1710.

In step S1803, similar to step S1602 illustrated in FIG. 16, the feature extraction and the normalization unit 1703 performs the feature vector generation and the feature vector normalization on the data input in step S1802. This processing enables obtaining a d-dimensional feature vector x based on the data input in step S1802. In step S1804, the non-specific category likelihood calculation unit 1704 calculates using the formula (31) the non-specific category likelihood based on the classifier data input in step S1801 and a normalized version of the d-dimensional feature vector x generated in step S1803.

In step S1805, a classification result output unit 1705 compares the non-specific category likelihood calculated in step S1804 with a threshold value. When the non-specific category likelihood is equal to or smaller than the threshold value, the classification result output unit 1705 determines that the normalized d-dimensional feature vector x is specific category data and that a control apparatus is normal. On the other hand, when the non-specific category likelihood is greater than the threshold value, the classification result output unit 1705 determines that the normalized d-dimensional feature vector x is not specific category data and that the control apparatus is abnormal. The classification result output unit 1705 outputs the result of the determination to the outside. Similar to step S405 illustrated in FIG. 4, the output form of the result of the determination is not limited to particular forms.

Based on information detected by a plurality of sensors (information from a plurality of sensors) installed in an apparatus such as a manufacturing apparatus, the above-described processing enables determining whether an abnormality has occurred in the apparatus. In particular, this processing increases the possibility of correctly determining an abnormality not only in a case where the sensor information input to the classifier is largely different from the sensor information in the normal state but also in a case where the input sensor information is close to the sensor information used for the learning of the pattern classifier under certain abnormal conditions.

As described above, the classifier may be a classifier for performing not only pattern classification on images and moving images but also pattern classification on such data as sensor information. Therefore, even a classifier for detecting an abnormality of an apparatus is able to correctly classify data largely different from specific category data used for learning and data close to non-specific category data used for learning. As described in the present exemplary embodiment, various types of pattern classifier learning methods such as the learning of a classifier based on the k-neighborhood method are employable.

The above-described exemplary embodiments are just examples for embodying the present invention, and not intended to restrict the scope of the present invention. More specifically, the present invention may be embodied in diverse forms without departing from the technical concepts or essential characteristics thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-188365, filed Sep. 25, 2015, which is hereby incorporated by reference herein in its entirety.

What is claimed is:

1. A classifier generation apparatus configured to generate a classifier that includes an Artificial Intelligence model in which calculation using one or more coefficients is performed, the classifier generation apparatus comprising one or more processors and one or more memories, the one or more processors being configured to execute instructions stored in the one or more memories, and, by executing the instructions stored in the one or more memories, being configured to function as:

an input unit configured to input a plurality of specific category data for learning known to belong to a specific category and at least one piece of non-specific category data for learning known not to belong to the specific category;

an acquisition unit configured to acquire feature vectors extracted from each of the plurality of specific category data for learning and a feature vector extracted from the at least one piece of non-specific category data for learning;

a determination unit configured to determine, by learning, the one or more coefficients that maximize a calculation result in calculation in which the feature vectors extracted from each of the plurality of specific category data and the feature vector extracted from the at least one piece of non-specific category data are inputted into a third target function that includes a first target function and a second target function, wherein the first target function includes the one or more coefficients, the first target function is based on a difference between a feature vector extracted from input data and the feature vectors extracted from each of the plurality of specific category data, and the first target function is for deriving a specific category likelihood, and where the second target function includes the one or more coefficients, the second target function is based on a difference between a feature vector extracted from the input data and the feature vectors extracted from the at least one piece of non-specific category data, wherein the second target function is a target function for adjusting the one or more coefficients, so that, in calculation of the specific category likelihood, which is performed based on the first target function and with input of the feature vector extracted from the at least one piece of non-specific category data, the calculated specific category likelihood represents a decreased value; and a generation unit configured to generate the classifier for identifying, based on the calculation of the specific category likelihood performed based on the first target function using the one or more coefficients determined by the determination unit, whether the input data is data belonging to the specific category.

2. The classifier generation apparatus according to claim 1, wherein the first target function is a target function for adjusting the one or more coefficients so that, in the calculation of the specific category likelihood which is performed with input of a feature vector deviating from the, feature vectors extracted from each of the plurality of specific category data the calculated specific category likelihood represents increased value.

3. The classifier generation apparatus according to claim 1, wherein the one or more processors is configured to further function as:

an initialization unit configured to initialize the one or more coefficients; and a correction unit configured to correct the one or more coefficients initialized by the initialization unit, by using the plurality of specific category data for learning and at least one of the non-specific category data for learning.

4. The classifier generation apparatus according to claim 1, wherein a formula including the one or more coefficients for calculating the specific category likelihood is a formula including differences between data subjected to calculation of the specific category likelihood and each of the plurality of specific category data for learning, and wherein the determination unit determines the one or more coefficients according to the difference between the non-specific category data for learning and each of the plurality of specific category data for learning.

5. The classifier generation apparatus according to claim 1, wherein the one or more processors is configured to further function as:
   a division unit configured to divide the plurality of specific category data for learning into a plurality of sets; and
   a derivation unit configured to derive a hyper parameter based on a subset which is a plurality of the sets excluding at least one set, the non-specific category data for learning, and a candidate of a hyper parameter used to determine the parameter,
   wherein the derivation unit determines the one or more coefficients based on the subset, the non-specific category data for learning, and the candidate of the hyper parameter by using the same method as the method for determining the one or more coefficients by the determination unit, evaluates a result of the determination based on sets different from the subset out of the plurality of the sets and the non-specific category data for learning, and derives the hyper parameter based on a result of the evaluation.

6. A classifier comprising one or more processors, the one or more processors being configured to function as:
   a calculation unit configured to calculate the specific category likelihood for input data by using the one or more coefficients determined by the classifier generation apparatus according to claim 1; and
   an identification unit configured to identify whether the input data is data belonging to the specific category based on a value calculated by the calculation unit.

7. The classifier generation apparatus according to claim 1, wherein the determination unit determines the one or more coefficients by optimizing the one or more coefficients included in the first target function and the one or more coefficients included in the second target function.

8. The classifier generation apparatus according to claim 1, wherein the classifier is a classifier for detecting an abnormality within a monitoring area based on an image captured by a monitoring camera,
   wherein the specific category is a category indicating a situation in which no anomaly occurs.

9. The classifier generation apparatus according to claim 1, wherein the first target function is a target function of a 1-class Support Vector Machine (SVM).

10. The classifier generation apparatus according to claim 1, wherein the first target function is a target function based on Kullback-Leibler Importance Estimation Procedure (KLIEP).

11. The classifier generation apparatus according to claim 1, wherein the classifier identifies whether the input data represents a face image indicating a specific person.

12. The classifier generation apparatus according to claim 1, wherein the classifier identifies whether an abnormality has occurred in the classifier generation apparatus based on information detected by a plurality of sensors provided in the classifier generation apparatus.

13. The classifier generation apparatus according to claim 1, wherein the determination unit determines the one or more coefficients by optimizing the one or more coefficients using a Sequential Minimal Optimization (SMO) method.

14. A classifier generation method configured to generate a classifier that includes an Artificial Intelligence model in which calculation using one or more coefficients is performed, the method comprising:

inputting a plurality of specific category data for learning known to belong to a specific category and at least one piece of non-specific category data for learning known not to belong to the specific category;
acquiring feature vectors extracted from each of the plurality of specific category data for learning and a feature vector extracted from the at least one piece of non-specific category data for learning;
determining, by learning, the one or more coefficients that maximize a calculation result in calculation in which the feature vectors extracted from each of the plurality of specific category data and the feature vector extracted from the at least one piece of non-specific category data are inputted into a third target function that includes a first target function and a second target function, wherein the first target function includes the one or more coefficients, the first target function is based on a difference between a feature vector extracted from input data and the feature vectors extracted from each of the plurality of specific category data, and the first target function is for deriving a specific category likelihood, and wherein the second target function includes the one or more coefficients, the second target function is based on a difference between a feature vector extracted from the input data and the feature vectors extracted from the at least one piece of non-specific category data,
wherein the second target function is a target function for adjusting the one or more coefficients, so that, in calculation of a specific category likelihood, which is performed based on the first target function and with input of the feature vector extracted from the at least one piece of non-specific category data, the calculated specific category likelihood represents a decreased value; and
generating the classifier for identifying, based on the calculation of the specific category likelihood performed based on the first target function using the one or more coefficients determined, whether the input data is data belonging to the specific category.

15. A non-transitory computer-readable storage medium storing a program for causing a computer to function as a classifier generation apparatus configured to generate a classifier that includes an Artificial Intelligence model in which calculation using one or more coefficients is performed, the classifier generation apparatus comprising one or more processors and one or more memories, the one or more processors being configured to execute instructions stored in the one or more memories, and, by executing the instructions stored in the one or more memories, being configured to function as:
   an input unit configured to input a plurality of specific category data for learning known to belong to a specific category and at least one piece of non-specific category data for learning known not to belong to the specific category;
   an acquisition unit configured to acquire feature vectors extracted from each of the plurality of specific category data for learning and a feature vector extracted from the at least one piece of non-specific category data for learning;
   a determination unit configured to determine, by learning, the one or more coefficients that maximize a calculation result in calculation in which the feature vectors extracted from each of the plurality of specific category data and the feature vector extracted from the at least one piece of non-specific category data are inputted into a third target function that includes a first target function and a second target function, wherein the first target function includes the one or more coefficients, the first target function is based on a difference between a feature vector extracted from input data and the feature vectors extracted from each of the plurality of specific category data, and the first target function is for deriving a specific category likelihood, and wherein the second target function includes the one or more coefficients, the second target function is based on a difference between a feature vector extracted from the input data and the feature vectors extracted from the at least one piece of non-specific category data, wherein the second target function is a target function for adjusting the one or more coefficients, so that, in calculation of a specific category likelihood, which is performed based on the first target function and with input of the feature vector extracted from the at least one piece of non-specific category data, the calculated specific category likelihood represents a decreased value; and a generation unit configured to generate the classifier for identifying, based on the calculation of the specific category likelihood performed based on the first target function using the one or more coefficients determined by the determination unit, whether the input data is data belonging to the specific category.

* * * * *